(12) United States Patent
Roche

(10) Patent No.: US 12,137,676 B2
(45) Date of Patent: *Nov. 12, 2024

(54) SELF-CLEANING PRE-FILTER FOR A WATER CIRCULATION PUMP

(71) Applicant: Stephen D. Roche, Nashville, TN (US)

(72) Inventor: Stephen D. Roche, Nashville, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/348,581

(22) Filed: Jul. 7, 2023

(65) Prior Publication Data

US 2023/0345918 A1  Nov. 2, 2023

Related U.S. Application Data

(63) Continuation of application No. 17/831,067, filed on Jun. 2, 2022, now Pat. No. 11,730,149, which is a continuation-in-part of application No. 16/366,680, filed on Mar. 27, 2019, now Pat. No. 11,375,698, which is a continuation-in-part of application No. 16/057,577, filed on Aug. 7, 2018, now abandoned, which is a continuation of application No. 14/317,496, filed on Jun. 27, 2014, now Pat. No.

(Continued)

(51) Int. Cl.
| | |
|---|---|
| A01K 63/04 | (2006.01) |
| B01D 35/02 | (2006.01) |
| C02F 1/00 | (2023.01) |
| C02F 3/32 | (2023.01) |
| C02F 103/00 | (2006.01) |

(52) U.S. Cl.
CPC ............ *A01K 63/045* (2013.01); *B01D 35/02* (2013.01); *C02F 1/001* (2013.01); *C02F 3/32* (2013.01); *A01K 63/04* (2013.01); *C02F 2103/007* (2013.01); *C02F 2303/24* (2013.01)

(58) Field of Classification Search
USPC ............ 119/74, 72, 259, 260, 261, 262, 200
See application file for complete search history.

(56) References Cited

U.S. PATENT DOCUMENTS

| | | |
|---|---|---|
| 2,351,712 A | 4/1941 | Sattele et al. |
| 3,217,882 A | 12/1962 | Ogletree |

(Continued)

FOREIGN PATENT DOCUMENTS

FR  2913348  * 9/2008 ............. B01D 29/68

*Primary Examiner* — Andrea M Valenti
(74) *Attorney, Agent, or Firm* — HOLLOWELL PATENT GROUP; Kelly Hollowell

(57) ABSTRACT

An exemplary water circulation pump pre-filter unit (PFU) comprises a backwash pipe in fluid communication with an outer nozzle outside a screen cage and an inner nozzle within the screen cage. The PFU may simultaneously spray inside and outside the screen cage using an inner nozzle and an outer nozzle configured with an axial jet perpendicular to a plurality of radial jets. The inner nozzle may have a restriction chamber with diameter decreasing in flow direction to a full cone nozzle outlet, concentrating dual streams from a plurality of inlets swirled through a plurality of helical channels. Pairs of inner nozzles may be angled to each other, increasing the inner surface area cleaned. Exemplary implementations may simultaneously clean the screen cage bottom and top using the outer nozzle and inner nozzles in backwash mode and in a separate pre-filter mode ingest water through multiple filter pipe inlet apertures.

5 Claims, 26 Drawing Sheets

Related U.S. Application Data

10,070,629, which is a continuation of application No. 13/836,649, filed on Mar. 15, 2013, now Pat. No. 8,800,496.

(56) References Cited

U.S. PATENT DOCUMENTS

| | | | |
|---|---|---|---|
| 3,242,872 A * | 3/1966 | Thompson | F04D 29/708 |
| | | | 417/313 |
| 3,920,187 A | 11/1975 | Willis | |
| 4,210,539 A * | 7/1980 | Shiban | B01D 33/073 |
| | | | 210/402 |
| 4,261,822 A | 4/1981 | Richardson | |
| 4,263,139 A | 4/1981 | Erlich | |
| 4,652,369 A | 3/1987 | DePolo et al. | |
| 5,520,808 A * | 5/1996 | Stoneburner | B01D 33/50 |
| | | | 210/393 |
| 5,815,544 A | 9/1998 | Lefter | |
| 5,993,652 A | 11/1999 | Stoneburner et al. | |
| 7,828,964 B1 | 11/2010 | Neibert | |
| 10,751,655 B2 * | 8/2020 | Hicks | B01D 41/04 |
| 11,730,149 B2 * | 8/2023 | Roche | C02F 1/001 |
| | | | 210/747.5 |
| 2004/0200770 A1 | 10/2004 | Clary | |
| 2008/0277500 A1 | 11/2008 | Decarne et al. | |
| 2010/0213114 A1 | 8/2010 | Pola | |
| 2011/0000506 A1 * | 1/2011 | Martin | B01D 41/04 |
| | | | 134/198 |
| 2013/0270163 A1 | 10/2013 | Zur et al. | |
| 2021/0379607 A1 | 12/2021 | Wang et al. | |

* cited by examiner

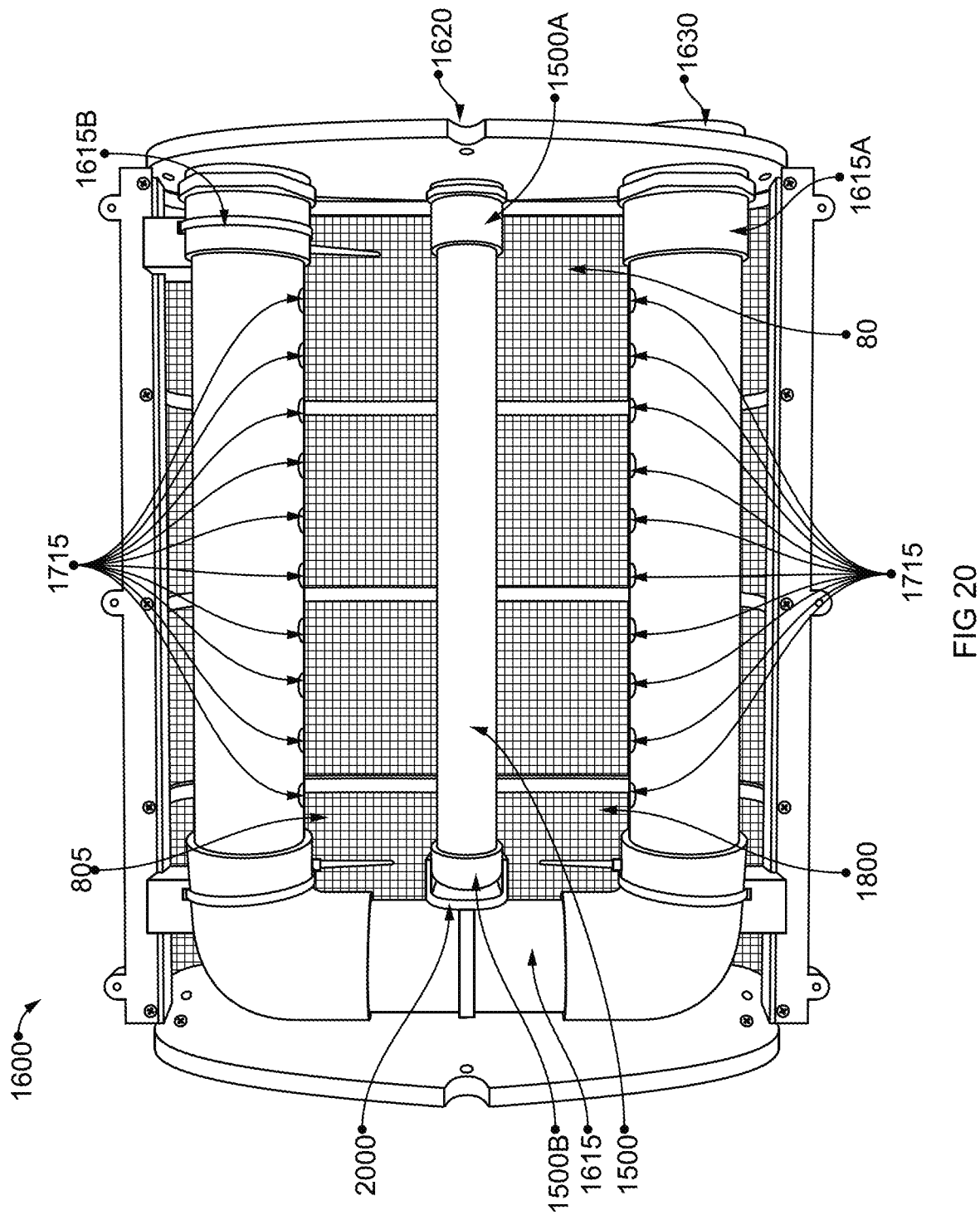

SELF-CLEANING PRE-FILTER FOR A WATER CIRCULATION PUMP

CROSS REFERENCE TO RELATED APPLICATIONS

This application is a continuation of U.S. patent application Ser. No. 17/831,067 filed Jun. 2, 2022, which is a continuation-in-part application of U.S. patent application Ser. No. 16/366,680 filed Mar. 27, 2019, which is a continuation-in-part of U.S. patent application Ser. No. 16/057,577 filed Aug. 7, 2018, which is a continuation of U.S. patent application Ser. No. 14/317,496 filed Jun. 27, 2014, now U.S. Pat. No. 10,070,629 issued Sep. 11, 2018 which is a continuation of U.S. patent application Ser. No. 13/836,649 filed Mar. 15, 2013, now U.S. Pat. No. 8,800,496 issued Aug. 12, 2014, the entire contents of which are incorporated herein by reference.

BACKGROUND OF THE INVENTION

The present invention relates to submerged, low maintenance filters for pond water circulation pumps. More specifically, to a pre-pump filter system having a biological mechanism and an internal self-cleaning mechanism to actively filter water before it enters a circulation pump thus improving water quality and extending the life of the pump.

It is very difficult to keep clean an outdoor Koi pond, ornamental pond or other aquatic habitat stocked with fish (hereafter, a pond). A pond must be kept clean and aerated to maintain a healthy aquatic ecosystem, which typically requires a circulation pump and a water filtration system to move and clean the water. Small particles of debris and algae can pass through standard water circulation pumps, but larger pieces of debris quickly block these pumps, slow water flow and can eventually stop, damage or destroy the pumps. Most filters internal to or associated with pond water circulation pumps require frequent cleaning, part replacement, and monitoring because they cannot effectively manage large quantities or pieces of debris.

One way of protecting the circulation pump is to use a pre-filter placed in line ahead of the pump to prevent large quantities and pieces of debris from entering the intake to the pump (hereafter, a pump intake pipe). However, pre-filters currently on the market are generally not well-suited for ponds because, when located in the pond, they are difficult to access, maintain and are unsightly. Pre-filters currently on the market are typically undersized and their designs may actually encourage clogging, resulting in decreased water flow which strains the motor on the pond's circulation pump triggering a fail-safe shutdown of the pump or causing damage to the pump.

What is needed is a submerged, low maintenance pre-filter that: (1) will withstand year-round use in an outdoor pond; (2) is of sufficient capacity that it will not easily clog; (3) can be submerged in a pond; (4) captures debris on a filtering surface so that it can be easily accessed by aquatic wildlife or mechanical cleaning methods; (5) can be raised above the bottom of the pond to optimize circulation and allow access to aquatic creatures; (6) is self-cleaning; (7) may be easily camouflaged without affecting its operation.

SUMMARY OF THE INVENTION

An exemplary water circulation pump pre-filter unit (PFU) comprises a backwash pipe in fluid communication with an outer nozzle outside a screen cage and an inner nozzle within the screen cage. The PFU may simultaneously spray inside and outside the screen cage using an inner nozzle and an outer nozzle configured with an axial jet perpendicular to a plurality of radial jets. The inner nozzle may have a restriction chamber with diameter decreasing in flow direction to a full cone nozzle outlet, concentrating dual streams from a plurality of inlets swirled through a plurality of helical channels. Pairs of inner nozzles may be angled to each other, increasing the inner surface area cleaned. Exemplary implementations may simultaneously clean the screen cage bottom and top using the outer nozzle and inner nozzles in backwash mode and in a separate pre-filter mode ingest water through multiple filter pipe inlet apertures.

The present invention is a pond water circulation pump pre-filter unit (PFU). The PFU is submerged and provides structural support for camouflage, which gives the system a natural aesthetic look and provides a space for fish to hide from non-aquatic predators. The PFU comprises at least two cleaning systems: (1) biological cleaning mechanism; and (2) an internal self-cleaning mechanism. Specifically, the PFU comprises several filtering surfaces that form a repository that collects pond debris, for example algae on which aquatic creatures such as fish may feed, thereby providing a biological cleaning mechanism. These filtering surfaces of the PFU also serve as the protective barrier that prevents large debris from entering the circulation pump yet allow smaller, harmless particles to pass unimpeded. The internal self-cleaning mechanism is a water spray mechanism used to clean the PFU from the inside-out without removing the PFU from the pond, draining the pond or physically accessing the PFU. Together, these features of the PFU improve the quality of the water in the pond, lower maintenance costs, significantly extend the interval between maintenance tasks, and extend the life of the pond's water circulation pump.

Various implementations may achieve one or more technical effect. For example, an exemplary PFU implementation may increase water flow and reduce debris accumulation around or beneath a submerged PFU screen cage. This facilitation may be a result of self-cleaning the inside and outside of the PFU screen cage simultaneously. For example, the space beneath a submerged PFU may be kept free of debris with spray from the screen cage outside, while the screen cage is sprayed clean from the inside of the screen cage. Such increased water flow and reduced debris accumulation may be a result of a PFU backwash pipe configured with at least one inner nozzle disposed to spray from the inside of the screen cage, and at least one outer nozzle disposed to simultaneously spray clean the outside of the screen cage. Reducing debris accumulation beneath a submerged PFU screen cage results in improved ease of access by aquatic creatures to edible biological matter on PFU filtering surfaces. An exemplary PFU implementation may be configured with one or more feature disclosed herein to increase water flow and reduce debris accumulation around or beneath a submerged PFU screen cage.

BRIEF DESCRIPTION OF THE DRAWINGS

FIG. 20 shows a top view of an exemplary PFU with the filter screen top removed.

DETAILED DESCRIPTION OF THE INVENTION

Figure 1:
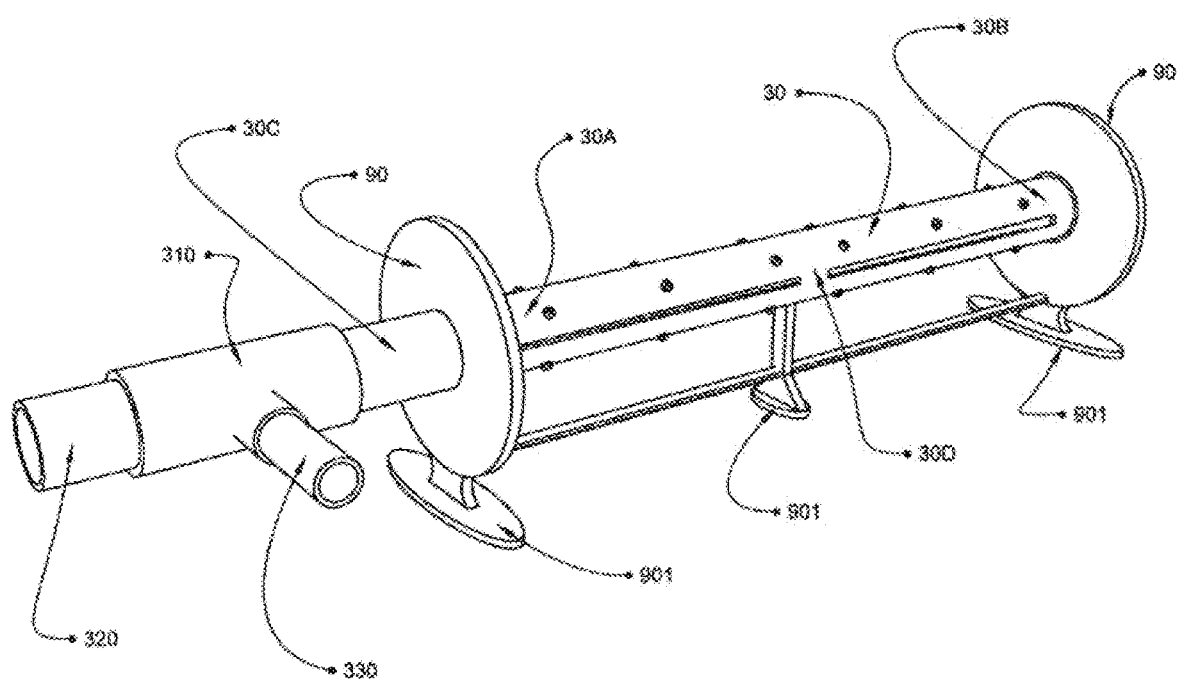
FIG. 1 shows a perspective view of the bidirectional conveyance pipe.

FIGS. 1-15 were previously disclosed and FIGS. 16-34 are new. The present invention is a water circulation pump pre-filter unit (PFU) supported by a frame having legs for placement of the PFU inside and at the bottom of a pond. The frame supports the filtering surfaces elevated above the bottom of the pond making them easily accessible to fish in the pond, increasing the total available surface area of the filtering surfaces to pond water, and making the filtering surfaces less prone to clogging. Additionally, by raising the filtering surfaces of the PFU off of the bottom of the pond, gravity will assist in pulling dense debris off of and down away from the PFU. The frame also provides support for camouflaging the PFU with risers and ornamental features, such as plants and pond rocks, without having these camouflaging materials touch the filtering surfaces or otherwise restrict water flow to the filtering surfaces or access by fish to the filtering surfaces.

The PFU comprises at least two cleaning systems: (1) a biological cleaning mechanism; and (2) an internal self-cleaning mechanism.

Regarding the biological cleaning mechanism, the PFU comprises several filtering surfaces that form a repository that collects pond debris on which aquatic creatures feed and provides a filter barrier to the water intake of the pond's circulation pump (hereafter a "screen cage"). More specifically, the screen cage prevents large debris from entering the circulation pump through the water intake system. The filtering surfaces of the screen cage are porous enough for water to freely flow through them, yet impermeable to large debris and other material that would be harmful to or overwork the circulation pump or the pond's other filter systems placed downstream from the pump. All of the mechanical parts of the PFU are located inside the screen cage providing maximum protection for the water intake to the pond's circulation pump and maximizing the available surface area to collect debris and algae, making it more difficult to clog. The suction created by the circulation pump gathers and holds debris and algae against the screen cage allowing fish to easily eat the debris and algae. By making each side of the screen cage accessible to the fish in the pond, the fish clean all sides of the screen cage by eating the debris and algae, masticating and/or digesting it into smaller particles that can pass safely through the pump.

The internal self-cleaning mechanism is a spray wash through a water supply pipe that complements the biological cleaning mechanism and doubles as a water supply for the pond. The water from the water source sprays the filtering surfaces of the screen cage from the inside, loosening impacted debris or carrying the debris away from the screen cage thereby opening spaces in the screen cage surface for water to pass. Additionally, agitating the debris in this way allows fish and other aquatic creatures to more readily access and consume it. The water source may be filtered and recycled pond water or water originating from an external source. This second cleaning mechanism may be used to clean the PFU without removing the PFU from the pond, draining the pond or physically accessing the PFU.

Together, the biological cleaning mechanism and the internal self-cleaning mechanism improve the quality of the water in the pond and extend the life of a pump. Hereafter "circulation pump" and "pump" are used interchangeably. The biological cleaning mechanism and the internal self-cleaning mechanism do not necessarily operate at the same time, rather the internal self-cleaning mechanism may be used intermittently to spray clean the screen cage or loosen debris that has caked on the filtering surfaces over time, while the biological cleaning mechanism keeps the screen cage clean the rest of the time. The screen cage is designed to have a total free-flowing surface area on the filter surfaces that is equal to or greater than the area of the aperture of the pump intake pipe.

An exemplary PFU implementation in accordance with the present disclosure may comprise a backwash pipe configured with one end within a screen cage. The backwash pipe may comprise at least one inner nozzle in fluid communication with the backwash pipe, wherein the at least one inner nozzle is disposed through a surface of the backwash pipe to spray an inner surface of the screen cage. The backwash pipe may be configured with at least two inner nozzles disposed at an angle to each other and through a surface of the backwash pipe. The inner nozzles disposed at an angle to each other may be disposed through the backwash pipe surface to spray and clear debris from inside the screen cage with a combined spray pattern. The combined spray pattern may increase the total free-flowing surface area, increase water flow, and reduce debris accumulation around or beneath a submerged PFU screen cage.

An exemplary backwash pipe may comprise an inner nozzle configured to concentrate available water pressure using a restrictor section comprising a variable diameter chamber. In an illustrative example, concentrating available water pressure on a screen cage inner surface target area to be cleared of debris may reduce the total water pressure needed to maintain an effectively operating pump, filter, and pond system. In an illustrative example, conserving water pressure used for self-cleaning by concentrating available water pressure on a screen cage inner surface target area may permit effective self-cleaning by a PFU implementation without a pump using a separate backwash water source such as a garden hose connected to a water main. The inner nozzle restrictor section variable diameter chamber may have a diameter that decreases in the flow direction toward a nozzle outlet. The inner nozzle outlet may be configured with a full cone nozzle to disperse water in a full cone spray pattern. In an illustrative example, dispersing water in a full cone spray pattern may maximize the total free-flowing surface area cleared from the screen cage inner surface. The inner nozzle restrictor section may concentrate water flow through the outlet of the inner nozzle from a pair of inlet ports configured in the inner nozzle. The inner nozzle may be configured with a swirling section comprising double helical channels designed to generate a swirling action as water jets pass from the pair of inlet ports through the double helical channels and restrictor section to the inner nozzle full cone outlet. The swirling action of water jets from the double helical channels may result in a more continuous and more powerful radial spray pattern from the full cone outlet. This more continuous and more powerful radial spray pattern from the full cone outlet may be a result of the double helical channels urging the water jets from a direction in line with the inner nozzle central axis toward a direction radial from the full cone outlet central axis. The double helical channels convert the water's velocity in line through the inner nozzle inlet into rotational velocity. Converting the water's velocity in line with the inlet to rotational velocity about the outlet central axis improves the strength of the outlet spray and reduces resistance to water flow at the interface between the restrictor section and the full cone outlet, by pre-positioning the water stream to spray radially from the full cone outlet.

An exemplary backwash pipe may comprise at least one outer nozzle in fluid communication with the backwash pipe, wherein the at least one outer nozzle is disposed through the screen cage to spray an outer surface of the screen cage from outside the screen cage. The outer nozzle may be in fluid communication with the backwash pipe through a port connector. The port connector may be, for example, a tube fluidly coupling the outer nozzle with the backwash pipe. The outer nozzle may comprise an inlet having an opening central axis substantially in line with an axial jet outlet in fluid communication with the inlet. The outer nozzle may comprise a plurality of radial jets having opening central axes substantially perpendicular to the inlet central axis. The outer nozzle may be disposed in the screen cage to spray parallel to the screen cage outer surface using the radial jets while simultaneously spraying perpendicular to the screen cage outer surface using the axial jet. An exemplary PFU implementation may be configured with an outer nozzle disposed in a screen cage bottom outer surface to clear debris underneath a submerged PFU, permitting water to flow with reduced resistance and enabling aquatic creatures to have easier access to the space under the PFU for protection and feeding. Simultaneously spraying parallel to the screen cage outer surface using the radial jets and perpendicular to the screen cage outer surface using the axial jet may increase the total free-flowing surface area, increase water flow, and reduce debris accumulation around or beneath a submerged PFU screen cage. Spraying radially parallel to the screen cage outer surface using the plurality of radial jets substantially equally spaced from an outer nozzle center point improves the effectiveness of the outer nozzle spray to drive water and material away from the screen cage substantially equally in all directions radially from the outer nozzle center point. In an illustrative example a nozzle with only one jet or jets only on one side of the nozzle would cause material to be sucked in from the backside of the nozzle along with the water pulled in the direction of the jet exiting the nozzle, degrading the nozzle cleaning effectiveness. Configuring the outer nozzle with the plurality of radial jets substantially equally distributed around a center point and configuring the outer nozzle to spray the radial jets substantially parallel with the outside of the screen cage eliminates any problem of material being sucked in from the backside of the nozzle. Configuring the outer nozzle with the plurality of radial jets substantially equally spaced from an outer nozzle center point outside the screen cage drives water and material substantially equally in all directions from the outer nozzle center point and improves the effectiveness of the outer nozzle spray to drive material away from the screen cage.

An exemplary PFU implementation in accordance with the present disclosure may comprise a filter pipe configured with one end within the screen cage. The filter pipe may be configured with a plurality of inlet apertures disposed along a length of the filter pipe. The filter pipe inlet apertures may be in fluid communication with a filter pipe outlet. The filter pipe inlet apertures may vary, increase, or decrease in size from an end of the filter pipe proximal to the filter pipe outlet, towards an end of the filter pipe distal from the filter pipe outlet. The filter pipe outlet may be in fluid communication with a circulation pump. The filter pipe outlet may be disposed outside of the screen cage.

FIG. 1 shows a perspective view of a bidirectional conveyance pipe 30 which combines the functions of the pump intake pipe 320 and the water supply pipe 330. The pump intake pipe 320 and the water supply pipe 330 are connected with the T-joint port 310 which controls the flow of water on either side of the conveyance pipe. This embodiment illustrates the PFU which includes a conveyance pipe 30, a water supply pipe 330, screen cage (shown in at least FIGS. 5, 9, 11, 12, 13, 14, 15, 16, 17, 18, 19A-19B, 20 and 32), and a frame 90. The conveyance pipe 30 has a proximal end 30A, a distal end 30B, a first length 30C between the frame 90 and the T-joint port 310 for connecting the conveyance pipe 30 to a circulation pump and a water supply pipe 330; and a second length 30D between the frame 90 and the distal end 30B. The water supply pipe 330 is a conduit for the inflow of water into the pond through the conveyance pipe 30. Specifically, the water supply pipe 330 attaches to a garden hose or other water source through an external port which may traverse the frame 90. In another embodiment, the frame is hollow and water fills the frame 90. This water supply pipe 330 is a PVC pipe. In another embodiment the water supply pipe is made of metal, plastic or other non-corrosive material.

Figure 2:
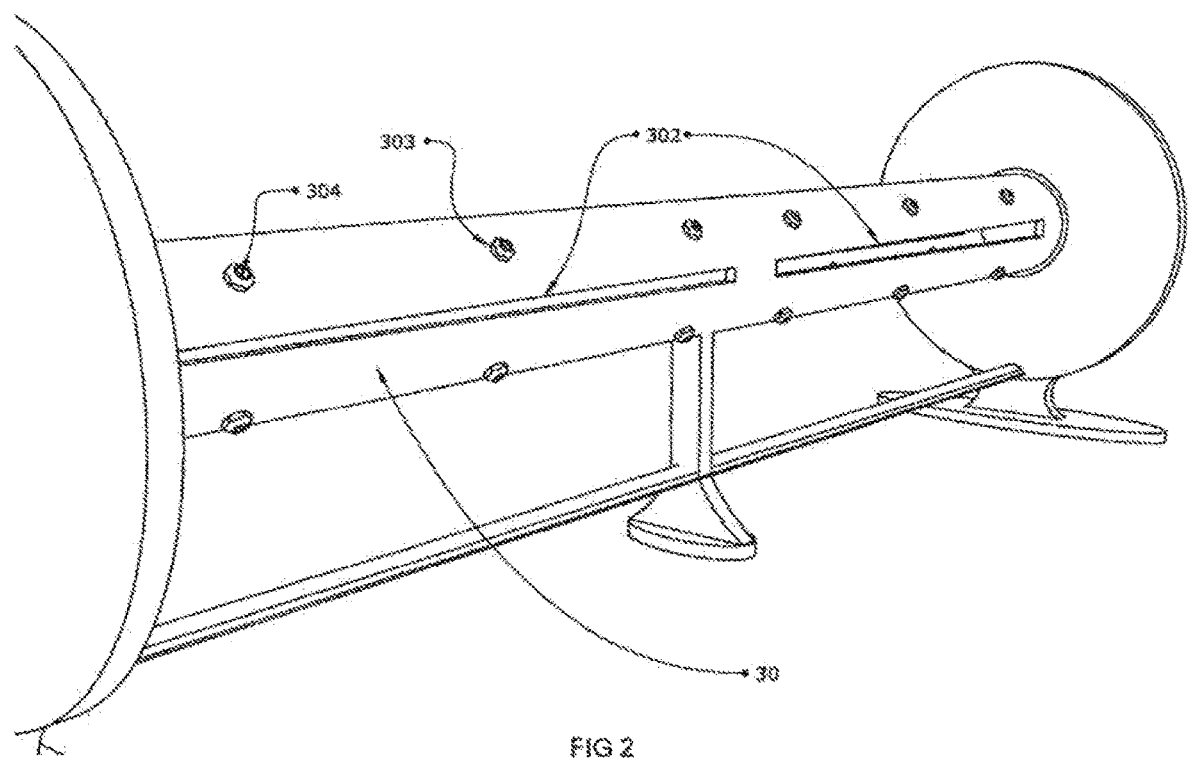
FIG. 2 shows the details of the slots and nozzles of the conveyance pipe.

Referring to FIG. 2, the conveyance pipe 30 is a conduit that attaches to an intake of a circulation pump through which water is suctioned or pulled from the pond by a circulation pump via the intake slots 302. In the present invention, the water pulled from the pond must first pass through the filtering surfaces on the screen cage (not shown) of the PFU. In one embodiment, the conveyance pipe has a plurality of holes 303 which are co-located and capped with a plurality of nozzles 304, said nozzles 304 control the outflowing water spray that results from a push of water pressure from the circulation pump by way of the intake pipe 320. The plurality of nozzles 304 are positioned along the length of the conveyance pipe 30.

Figure 3:
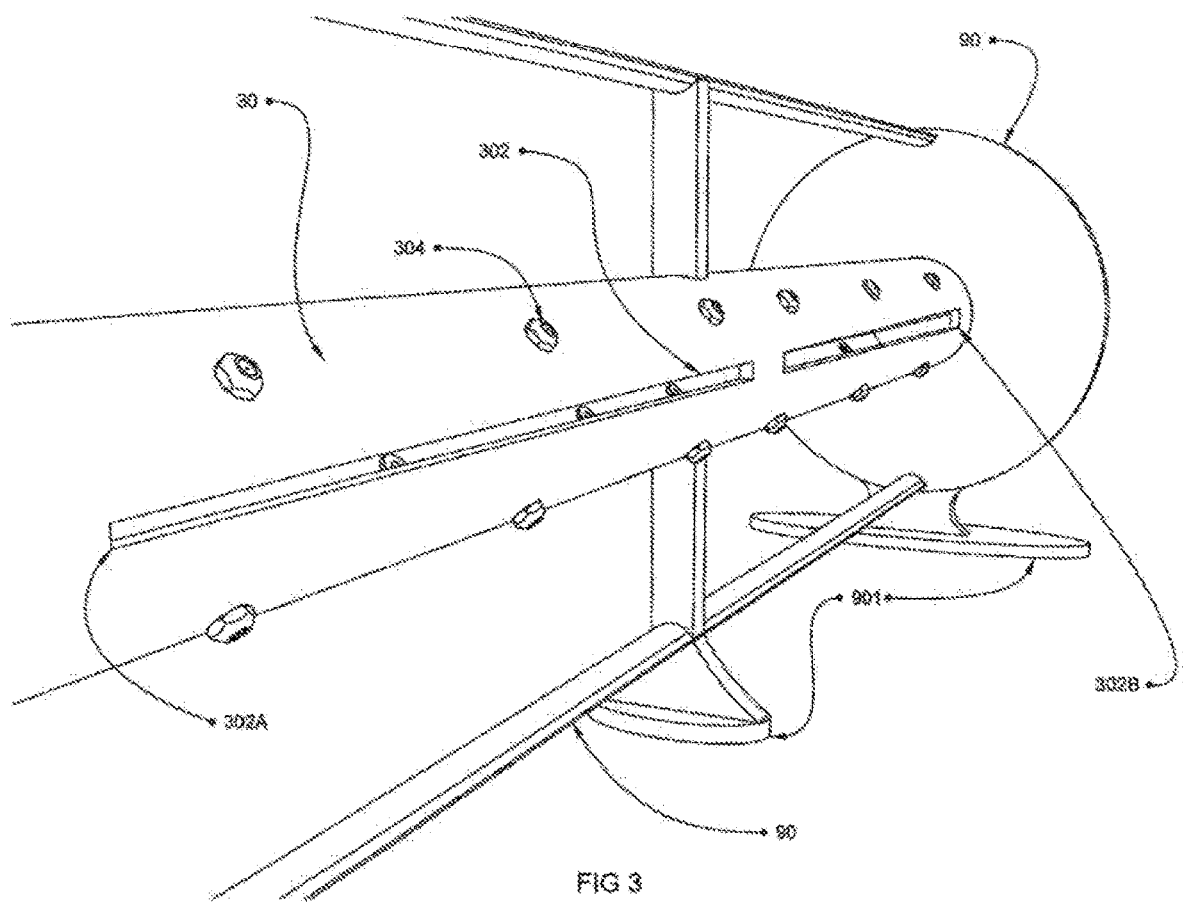
FIG. 3 shows a perspective view of the slots and nozzles of the conveyance pipe.

FIG. 3 shows another view of the slots 302 and nozzles 304 of the conveyance pipe 30. In an embodiment, water flows into the conveyance pipe 30 through slots 302 extending along the sides of the conveyance pipe. Intake slots 302 distribute pressure load more uniformly across the filter screen surface than more commonly used intake holes. In addition and to compensate for higher flow rates closer to the pump, both intake port flow options grow wider as their distance from the pump increases. The intake slots 302 include a first end 302A and a second end 302B, the first end 302A of the intake slots is closer to the pump. The size of the opening of the intake slots is variable and increases along the slot, from the first end to the second end, in order to distribute the pressure load uniformly across the filter screen surface. This compensates for higher flow rates which are generated closer to the pump.

Figure 4:
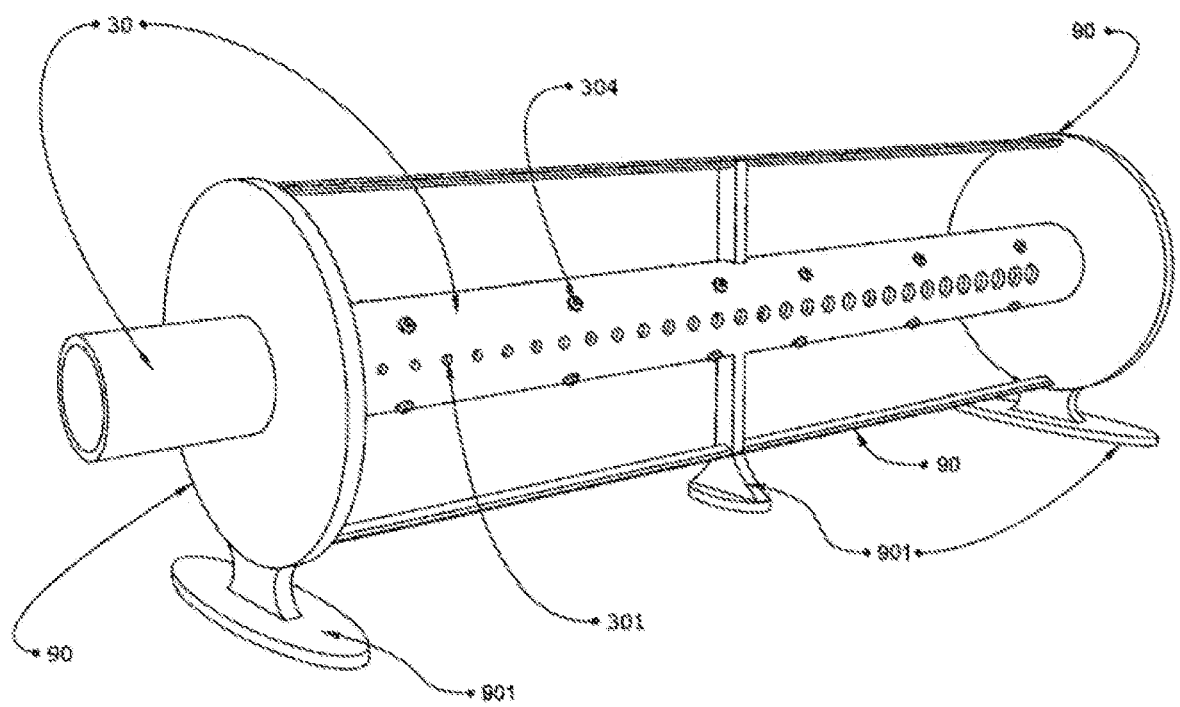
FIG. 4 shows a single water conveyance pipe with a plurality of holes on the pipe.

FIG. 4 shows another embodiment of single water conveyance pipe 30 in which the slots 302 are replaced with a plurality of holes 301 on the pipe. In another embodiment, the diameter of the holes may increase in diameter size moving distally and/or be placed closer together moving distally along the conveyance pipe 30 (as shown in FIG. 4). This compensates for higher flow rates which are generated closer to the pump.

Figure 5:
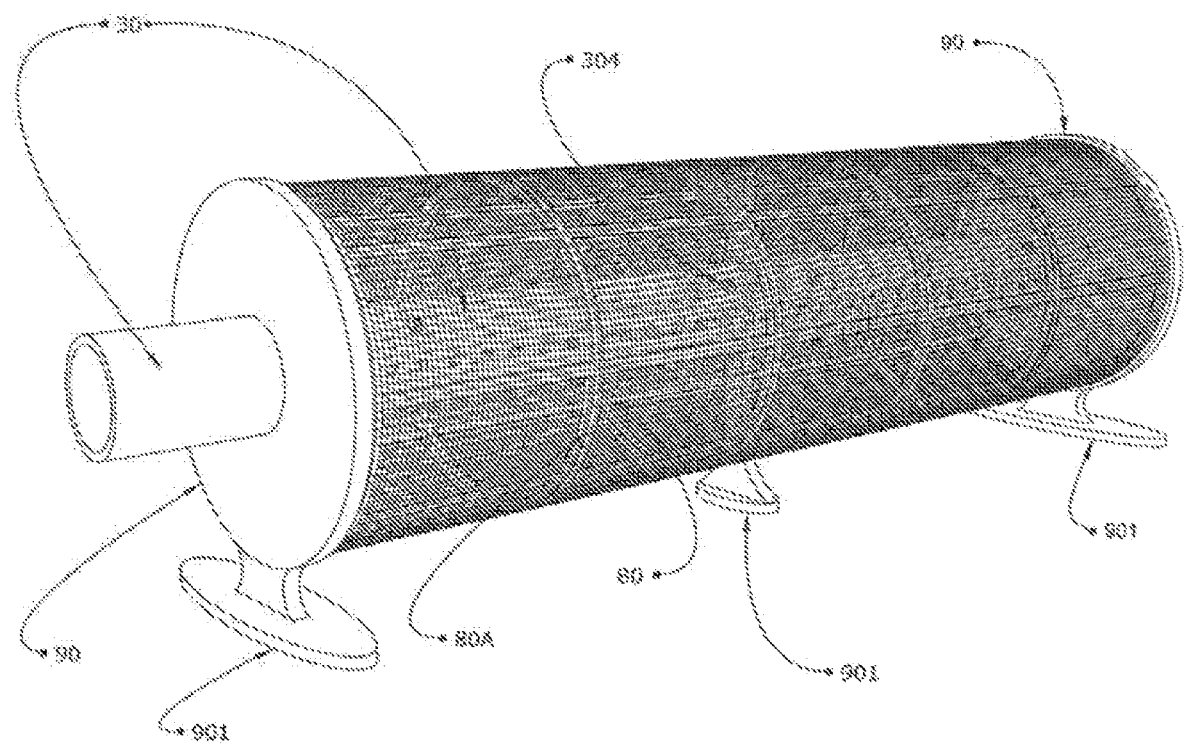
FIG. 5 shows FIG. 4 with a screen cage.

FIG. 5 is FIG. 4 with the screen 80 and screen support structure 80A which keeps the screen cage 80 from collapsing if it gets too clogged such as with algae or debris. In an illustrative example the screen support structure 80A provides an internal structure to define the shape of the screen and for the screen to rest upon.

Figure 6:
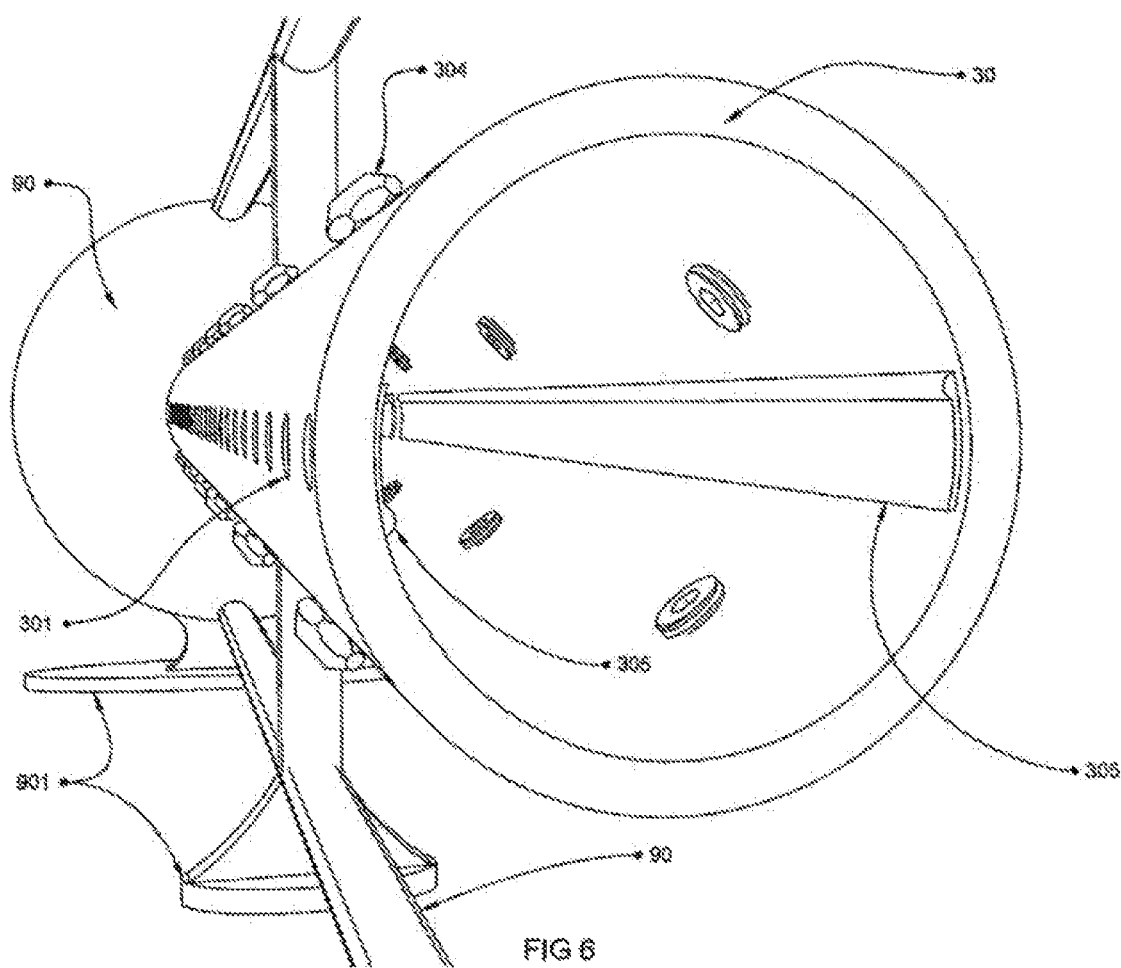
FIG. 6 shows an interior view of the conveyance pipe including a closure in a closed state.

FIG. 6 shows an interior view of the conveyance pipe 30 including a closure 305 in a closed state. The intake ports which are the slots 302 or plurality of holes 301 (hereafter called generically "intake ports") are coupled with the closure 305. In general, the closure is normally closed, and the intake ports are sealed when the PFU is not operating (neither filtering nor backwashing). The closure 305 and thus the intake ports are in an open or closed state depending on the direction of water flow in the conveyance pipe.

During operation, the pre-filter unit draws water into the circulation pump. During filtering mode, the circulation pump creates a low pressure area inside the conveyance pipe 30 which further causes higher pressure water outside the conveyance pipe 30 to push inside through the intake ports. In backwash mode, the water is pushed into conveyance pipe 30 via water supply pipe 330 in order to create pressure causing the closure 305 to close and seal the intake ports thereby allowing the water to flow only through the plurality of nozzles 304. The backwash water is prevented from escaping through the intake ports. As a result, the conveyance pipe 30 distributes the water pressure across the filter cage in order to loosen and or dislodge algae and debris on the filtering surfaces when the screen cage is submerged in water.

Figure 7:
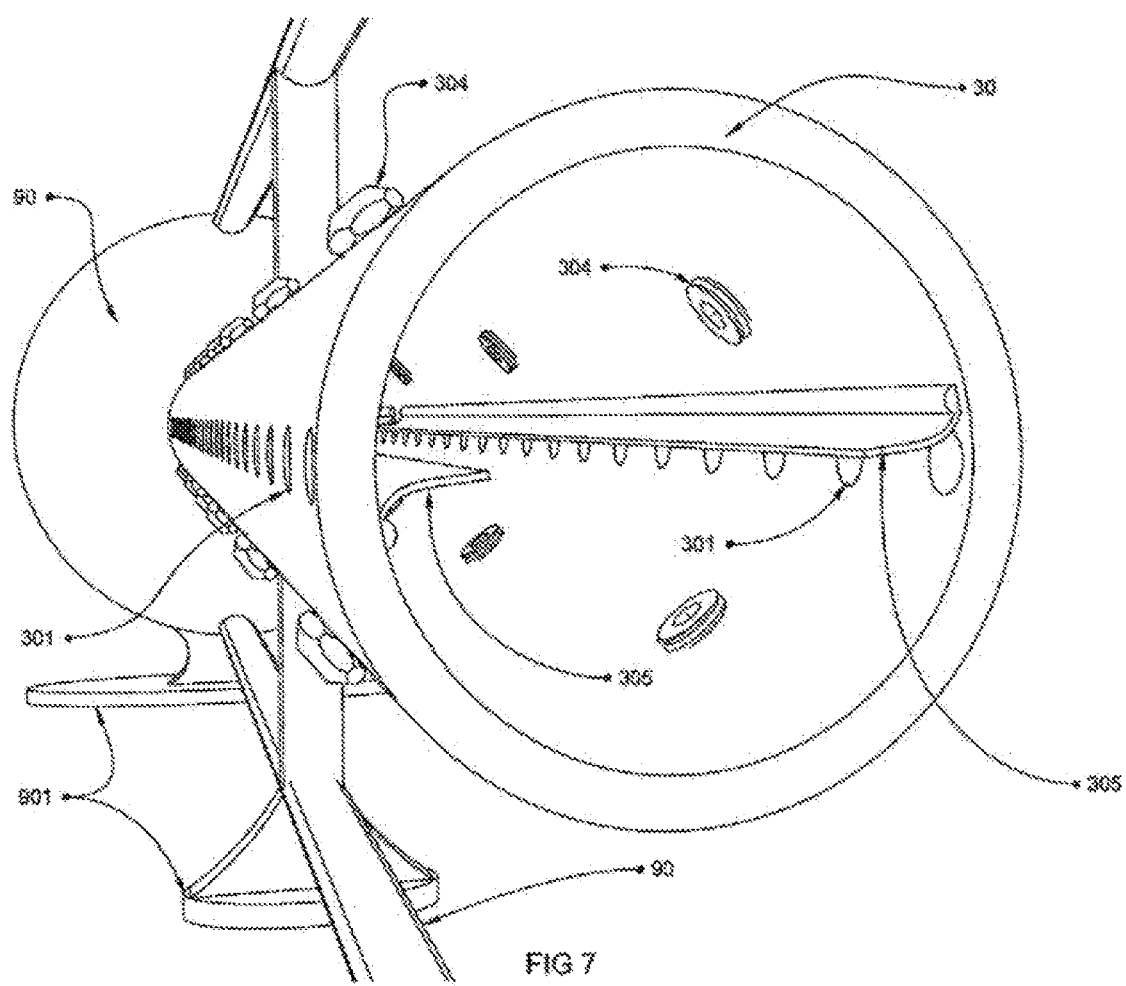
FIG. 7 shows an interior view of the conveyance pipe including a closure in an open state.

FIG. 7 shows an interior view of the conveyance pipe 30 including a closure 305 in an open state. During operation of filtering mode, the pump creates a low pressure area inside the conveyance pipe 30 which causes higher pressure water outside the pipe to push and hold open the closure 305.

Each screen cage 80 has at least one filtering surface. See for example FIGS. 5 and 12. In one embodiment, there is at least one conveyance pipe 30 for every screen cage 80. Within this embodiment, the water flow in each conveyance pipe 30 is bidirectional. That is water can flow toward the pump during filtering mode or reversed to flow through the filter cage during backwashing mode. However, simultaneous bidirectional flow in systems with one filter screen cage requires more than one conveyance pipe in the pre-filter unit.

Figure 8:
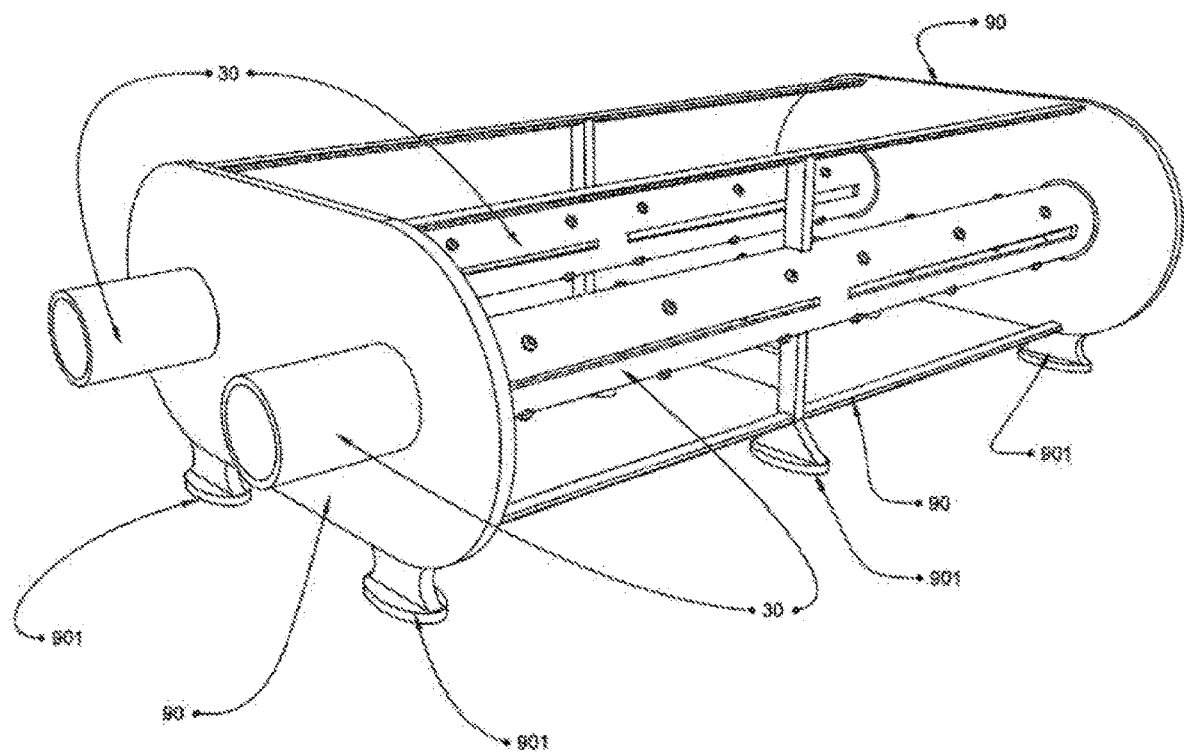
FIG. 8 shows a pre-filter unit with two-conveyance pipe configuration.

FIG. 8 shows an embodiment of single cage with two a two-conveyance pipe 30 configuration. A larger sized single cage can accommodate more than two conveyance pipes 30 (embodiment not shown). A PFU system with a single conveyance pipe 30 requires an external water source for backwashing mode. It's not possible to simultaneously push and pull water through the same conveyance pipe. For backwash mode in this configuration, water flow from the pump must be stopped. In an implementation using a T-joint, such as depicted at least by FIG. 1, water flow from the pump through the T-joint port must be stopped for water to flow through the T-joint port from the external water source through the conveyance pipe 30.

Figure 9:
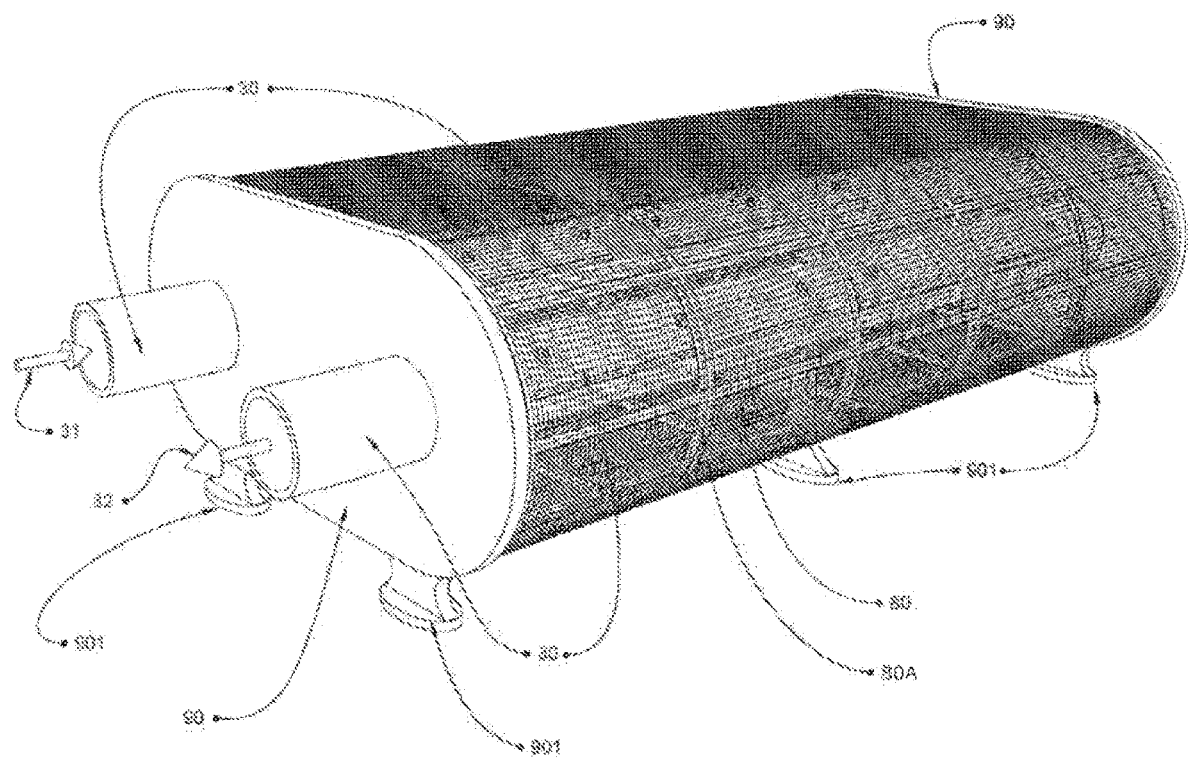
FIG. 9 shows FIG. 8 with a screen cage.

FIG. 9 is FIG. 8 with the screen cage 80 and screen support structure 80A which keeps the screen cage 80 from collapsing if it gets too clogged such as with algae or debris. FIG. 9 also shows an embodiment with two conveyance pipes 30 that could be in a single screen cage. In such an embodiment, it is possible for water flow to be bidirectional, that is flowing into one conveyance pipe 30 and out of the other conveyance pipe 30, as indicated by the water flow arrows 31 and 32.

Figure 10:
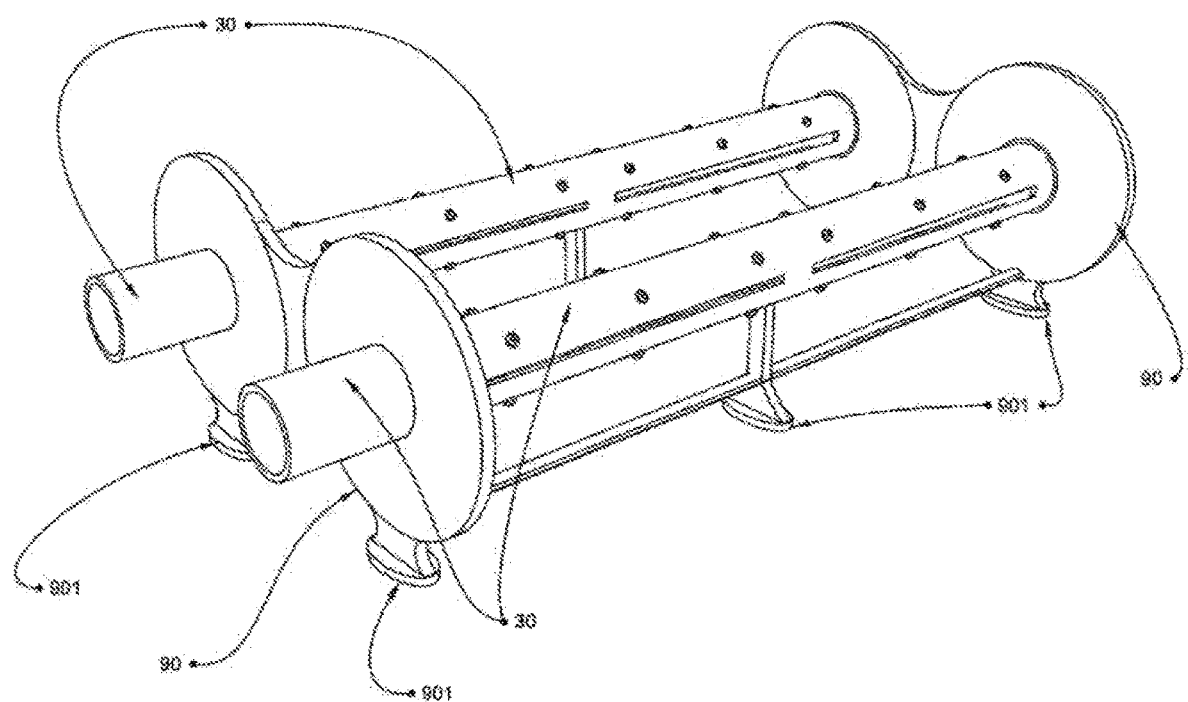
FIG. 10 shows multiple conveyance pipes that are in two separate cages.

FIG. 10 shows an embodiment with two conveyance pipes 30 that could be in two separate screen cages. In such an embodiment, it is also possible for water flow to be bidirectional, that is flowing into one conveyance pipe 30 and out of the other conveyance pipe 30, as indicated by the water flow arrows in FIG. 10. (Water flow arrows not shown.)

Figure 11:
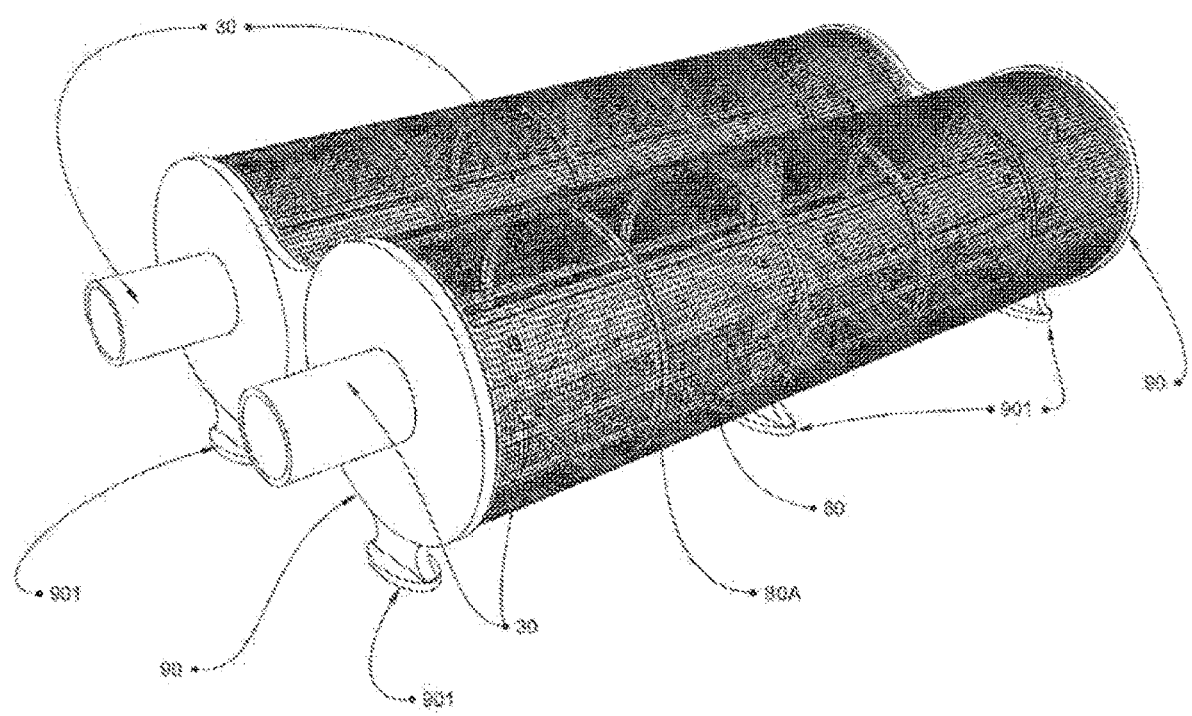
FIG. 11 shows FIG. 10 with a screen cage

FIG. 11 is FIG. 10 with two separate screen cages 80 and screen support structure 80A which keeps the screen cage 80 from collapsing if it gets too clogged such as with algae or debris.

Figure 12:
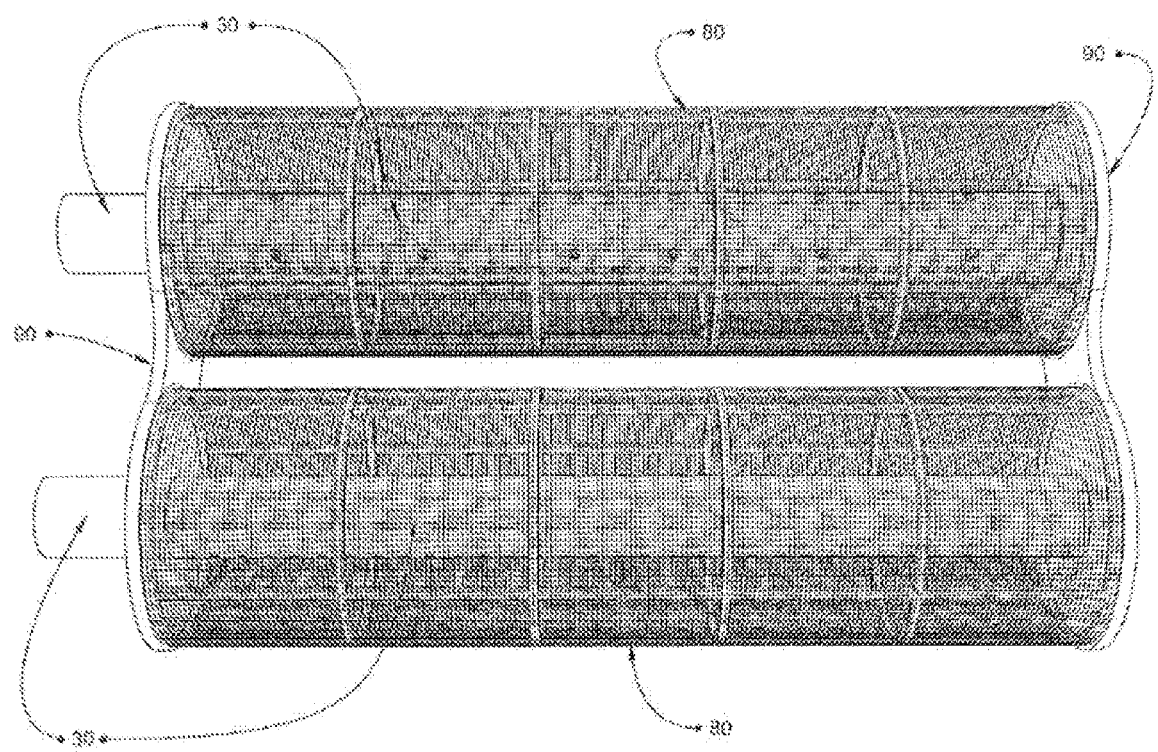
FIG. 12 shows the top view of FIG. 10.

FIG. 12 shows top view of FIG. 10 with two screen cages 80 each screen cage 80 containing a single conveyance pipe 30. With two or more cages, one cage can be in backwash mode while the other(s) are in filtering mode. The pump does not necessarily need to stop. Backwashing water can be supplied by taking a tap off the filter pump output or from an external water source. FIG. 10 and FIG. 11 demonstrate a two cage PFU system and FIG. 12 is a top view the same two cage PFU system. In multiple cage configurations, flow valves may be required to direct water flow in the proper direction.

In one embodiment, when the water source is turned on, the water that enters the water supply pipe 330 travels to the conveyance pipe 30 which in turn causes pressure to increase inside the pipe chamber. Water exits through the holes 303. In one embodiment, the holes 303 are capped by nozzles 304. The nozzles 304 make it possible to spray the outflowing water in specific directions from the inside of the screen cage 80 outward to loosen debris and algae that has settled on the outside surface of the screen cage 80. In another embodiment, the nozzles 304 direct high-pressure water flow to focused areas and the nozzles to cover the majority of all filtering surfaces. One of ordinary skill in the art could design the internal self-cleaning mechanism in other ways so long as it pushes enough water from inside the screen cage to clean debris and algae off the filtering surfaces. In other embodiments, this may be accomplished using a series of nozzles that are turned on and off by a control mechanism. In one embodiment, a pressurized air source is used to augment the water source. In another embodiment, the PFU is treated with a protective coating to prevent growth of algae or biofilms on the PFU.

In another embodiment, the pump intake pipe 320 is inside the screen cage 80. This embodiment includes a frame 90 having at least three supports 901, a circulation pump (not shown) attached to a T-joint port 310 and a water source 330 attached to a second port (not shown). In one embodiment, the frame leg supports 901 elevate the screen cage 80 above the bottom of a pond or other body of water. This makes the filtering surfaces of the screen cage 80 easily accessible to fish from the top and bottom of the screen cage 80. In one embodiment, the legs 901 are adjustable with regard to height and placement under the frame 90.

Hiding man-made components on the bottom of a pond can be done in several ways, for example a single large rock covering the components, plants, or even some type of black material that matches the pond liner. To create a completely natural look, it may be desirable to create a false-bottom pond by covering the entire pond floor in rocks and plants. But, placing rocks or planters directly onto a pond liner or pond bottom can cause problems. While these rocks and plants increase overall surface area for beneficial bacteria, they can also create locations where water does not circulate and where the oxygen becomes depleted. In these low-oxygen areas, anaerobic bacteria can thrive and begin to compete with beneficial bacteria creating toxins that can harm other aquatic creatures in the pond. The PFU allows for the use of a false bottom that allows water flow below and around the rocks, which promotes a healthy ecosystem.

Figure 13:
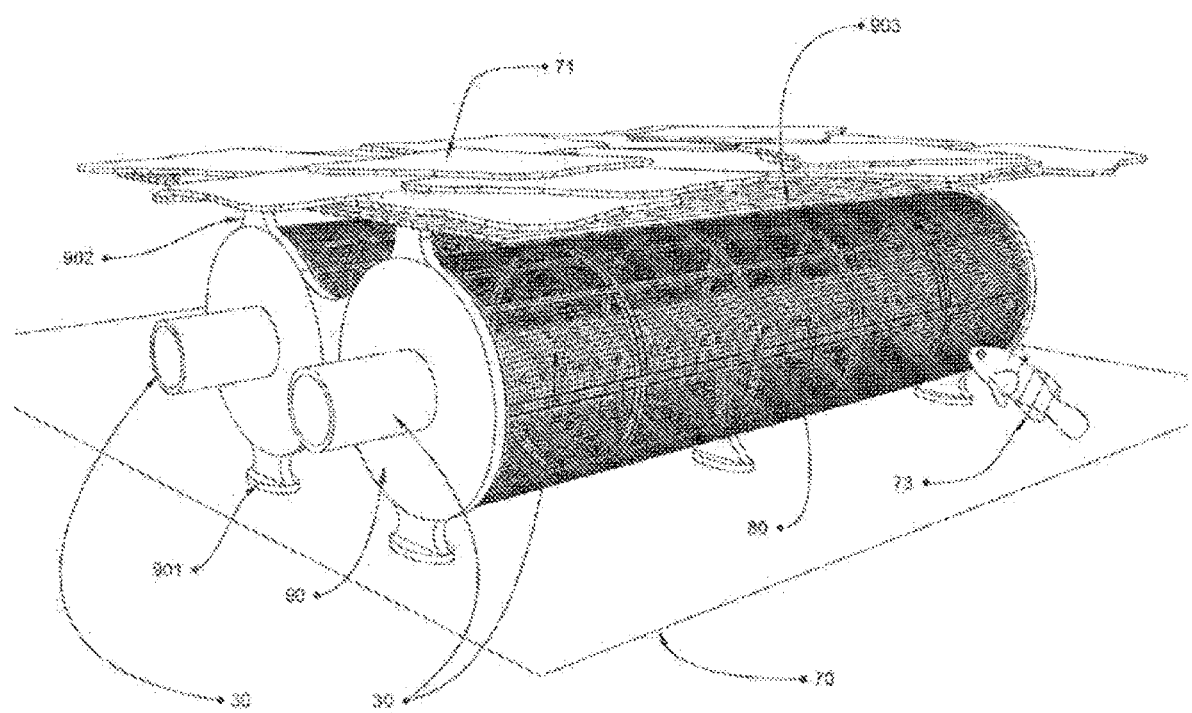
FIG. 13 shows a top view of a PFU partially camouflaged in a pond by ornamental rocks and a cutaway view of the PFU below.

FIG. 13 shows a top view of a PFU partially camouflaged in a pond by ornamental rocks 120 and a cutaway view of the PFU below. As shown, however, these ornamental rocks 120 are not actually on the bottom of the pond, but rather form a false bottom creating a space between the ornamental rocks 120 and the pond liner below. The PFU, the pump and other man-made components are placed in this space, concealing them and achieving a natural presentation when viewed from above. The space also provides a sanctuary for fish to escape non-aquatic predators.

Placing the PFU under a false bottom of ornamental rocks creates a problem. Specifically, hidden under the rocks, the user cannot see or easily access the pump or PFU. This necessitates the active internal cleaning mechanism illustrated in above FIGS, an active water spray wash for the PFU, which is accessible without removing the PFU from the pond, draining the pond or physically accessing the PFU.

In one embodiment, risers or other supports 130 are placed on top of the submerged PFU. These risers 130 support the ornamental rocks 120 so that the rocks will not damage the PFU or cause a tear in the screen cage 80. The risers 130 or other supports for the ornamental rocks 120 need to be made of materials that will not deteriorate or corrode in water. Sample materials include aluminum, stainless steel, polyvinyl chloride (PVC) and polypropylene plastic, or any combination of corrosive resistant materials. In one embodiment, the risers 130 are made from an old plastic pallet. The ornamental rocks 120 are both decorative and protective. They also provide a safe space for fish to hide from non-aquatic predators—cats, birds, children, etc.

Figure 14:
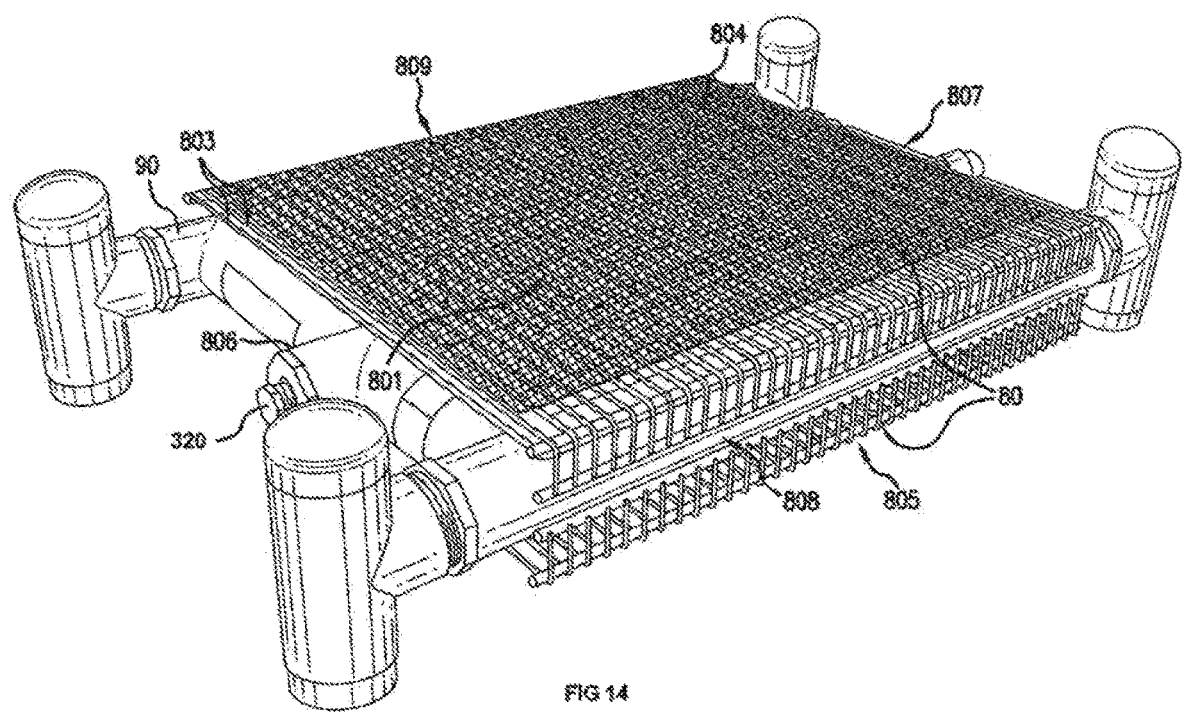
FIG. 14 shows an angle view of the PFU with the filtering surfaces in place.

FIG. 14 shows a rudimentary embodiment of the PFU with the screen cage 80. The screen cage 80 is a filtering surface comprising a plurality of filtering layers that include, for example, fine mesh screens (or "grates") 801 supported by powder-coated wire shelving 803. In this embodiment, the frame 90 and screen cage 80 are in the shape of a 3-dimensional rectangle screen cage 80 having a top 804, a bottom 805, front side 806, back side 807, a right end 808 and a left end 809. The fine mesh screens 801 on the top 804 and bottom 805 surfaces are the filtering surfaces. The screens collect debris that can be eaten by aquatic creatures in the pond and/or cleared away using the internal cleaning mechanism. The screens provide easy access for aquatic creatures to consume, masticate, or otherwise break up the debris into smaller pieces that can safely pass through the pump.

In one embodiment, the right end 808 and left end 809 of the screen cage are formed by the PFU frame 90 with only the top 804 and bottom 805 of the screen cage being filtering surfaces. That is, the front and back sides are closed by the PFU frame 90 itself while top 804 and bottom 805 are filtering surfaces of the screen cage 80. The PFU is, however, closed to large debris as the front side 806 and back side 807 are blocked by the PFU frame 90. That is, any water from the pond must pass through the screen cage to enter an alternate pump intake pipe 320.

In another embodiment, the screen cage 80 and/or the filtering surfaces have the shape of a cylinder, sphere, pyramid, cone, prism, or other polyhedron. In another embodiment, the screen cage 80 has a pleated surface to provide additional surface area along the filtering surfaces.

Figure 15:
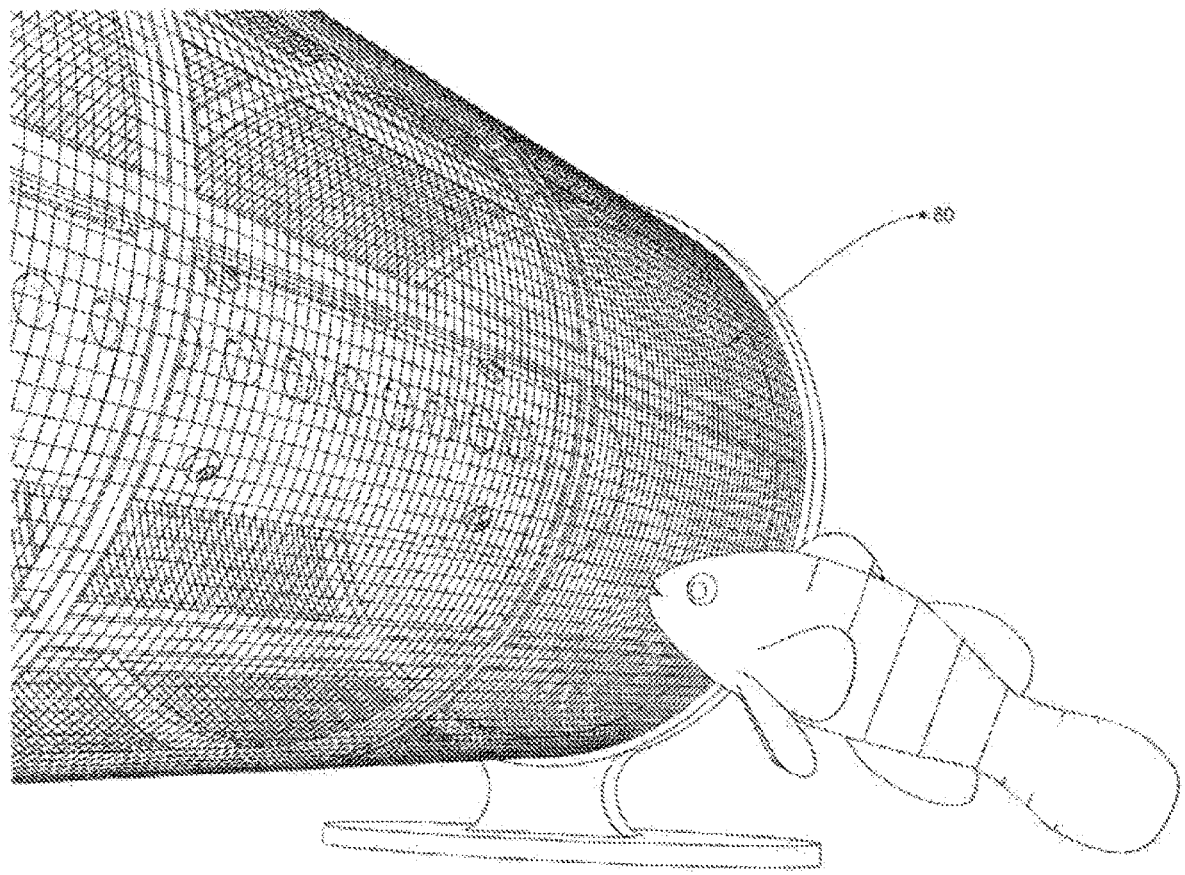
FIG. 15 shows a schematic of the PFU biological cleaning mechanism.

FIG. 15 is a schematic of the first cleaning mechanism of the PFU having aquatic creatures eat the debris deposited on the outside of the screen cage 80, i.e., the biological cleaning mechanism. Fish have been videotaped cleaning the outside of the screen cage, and this cleaning by the fish reduces the frequency that the internal cleaning mechanism needs to be used. The internal self-cleaning mechanism (implemented simply by turning on the water source connected to the water supply pipe) is needed only when the debris build-up on the outside of the screen cage 80 outpaces the appetite/eating capacity of and/or number of aquatic creatures in the pond. It is notable that Koi and goldfish are largely dormant in colder temperatures, so the frequency for using the internal self-cleaning mechanism may be temperature dependent. In one embodiment, the temperature of the pond 2 is controlled by adding warm water that is heated using solar panels and/or other methods of heating water known to those of ordinary skill in the art, to optimize the feeding activity of the aquatic creatures.

Figure 16:
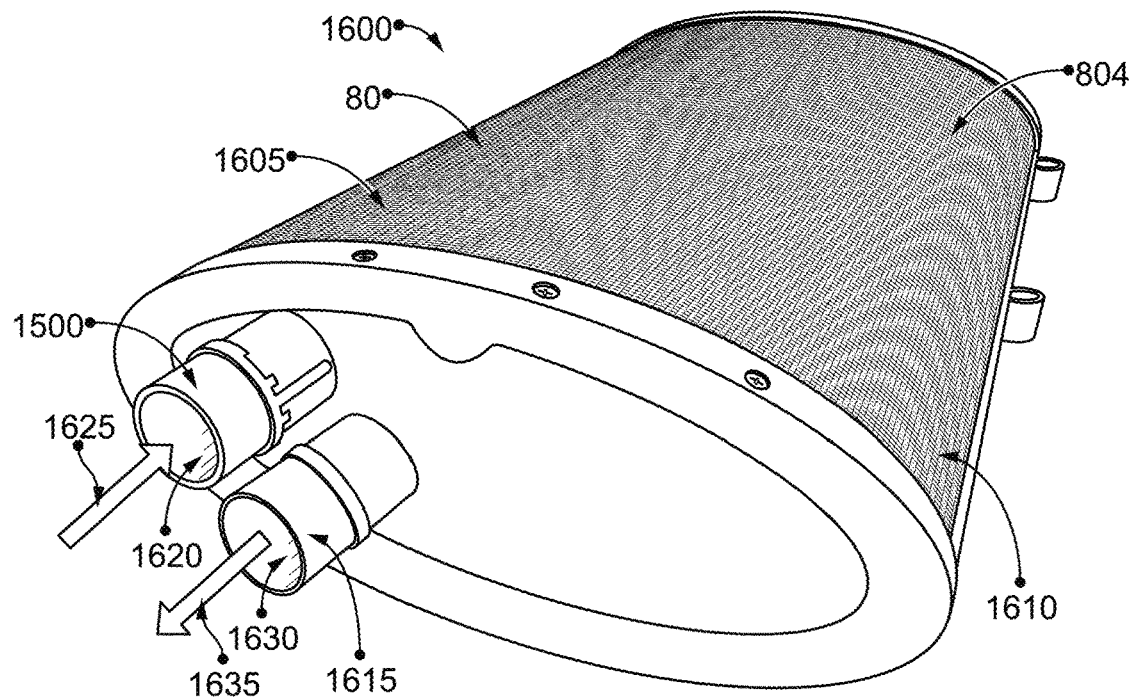
FIG. 16 shows a top perspective view of an exemplary pre-filter unit (PFU).

FIG. 16 shows a top perspective view of an exemplary pre-filter unit (PFU). In FIG. 16, the exemplary PFU 1600 includes the screen cage 80. In the depicted implementation the screen cage 80 comprises the screen cage outer surface 1605 including the screen cage top filtering surface 1610 configured in the screen cage top 804. In the illustrated implementation the PFU 1600 may be configured in fluid communication with an environment (for example a pond) through the screen cage 80, the backwash pipe 1500, and the filter pipe 1615. In the depicted implementation the backwash pipe 1500 and the filter pipe 1615 extend within the screen cage 80. The depicted backwash pipe 1500 includes the backwash pipe inlet 1620 configured to receive water into the screen cage 80, in the direction of the arrow indicating the backwash pipe water flow 1625. The depicted filter pipe 1615 includes the filter pipe outlet 1630 configured to expel water from the screen cage 80, in the direction of the arrow indicating the filter pipe water flow 1635. The filter pipe outlet 1630 may be in fluid communication with an outlet of a circulation pump within the screen cage 80.

Figure 17:
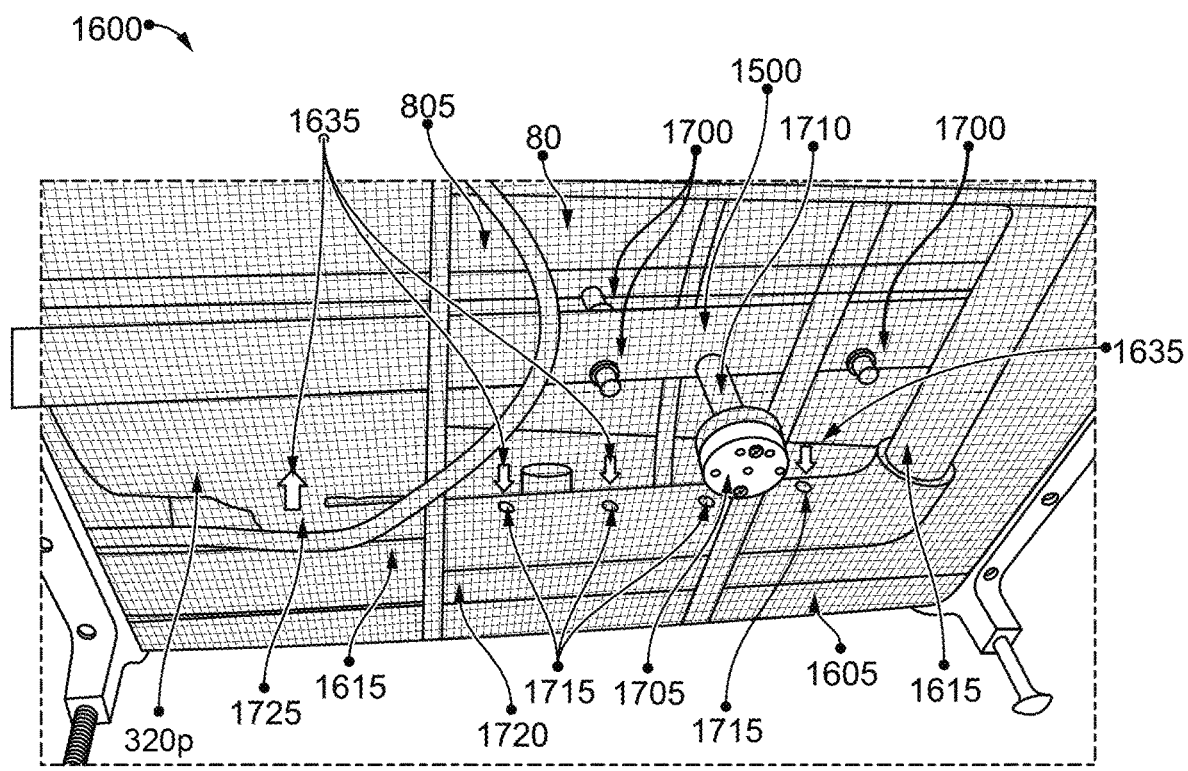
FIG. 17 shows a bottom perspective view of an exemplary PFU.

FIG. 17 shows a bottom perspective view of an exemplary PFU. In FIG. 17, the exemplary PFU 1600 includes the screen cage 80 comprising the screen cage outer surface 1605 including the screen cage bottom filtering surface 1720 configured in the screen cage bottom 805. In the depicted implementation the backwash pipe 1500 is configured with a plurality of inner nozzles 1700 and one outer nozzle 1705. The plurality of inner nozzles 1700 are disposed in the backwash pipe 1500 to spray clean from the inside of the screen cage 80 the screen cage 80 top and bottom with water from the backwash pipe 1500. The outer nozzle 1705 is configured to spray clean the outside of the screen cage 80 with water from the backwash pipe 1500. The depicted outer nozzle 1705 is disposed in the screen cage outer surface 1605 in the screen cage bottom 805 to drive debris from the space around and beneath the screen cage 80. In the depicted implementation the outer nozzle 1705 is configured in fluid communication with the backwash pipe 1500 through the port extension 1710. The port extension 1710 may be a tube or pipe section. In the depicted implementation the interface between the outer nozzle 1705 and the screen cage outer surface 1605 in the screen cage bottom 805 has been sealed to conserve pressure in the outer nozzle 1705. In the depicted implementation the filter pipe 1615 is configured with a plurality of filter pipe inlet apertures 1715 disposed along the length of the filter pipe 1615. In the depicted implementation the filter pipe inlet apertures 1715 are in fluid communication with the screen cage 80 interior to ingest water from within the screen cage 80 in the direction of the arrows indicating the filter pipe water flow 1635. In the depicted implementation the filter pipe 1615 is in fluid communication with an inlet of the circulation pump 320$p$ via the filter pipe pump connection 1725.

Figure 18:
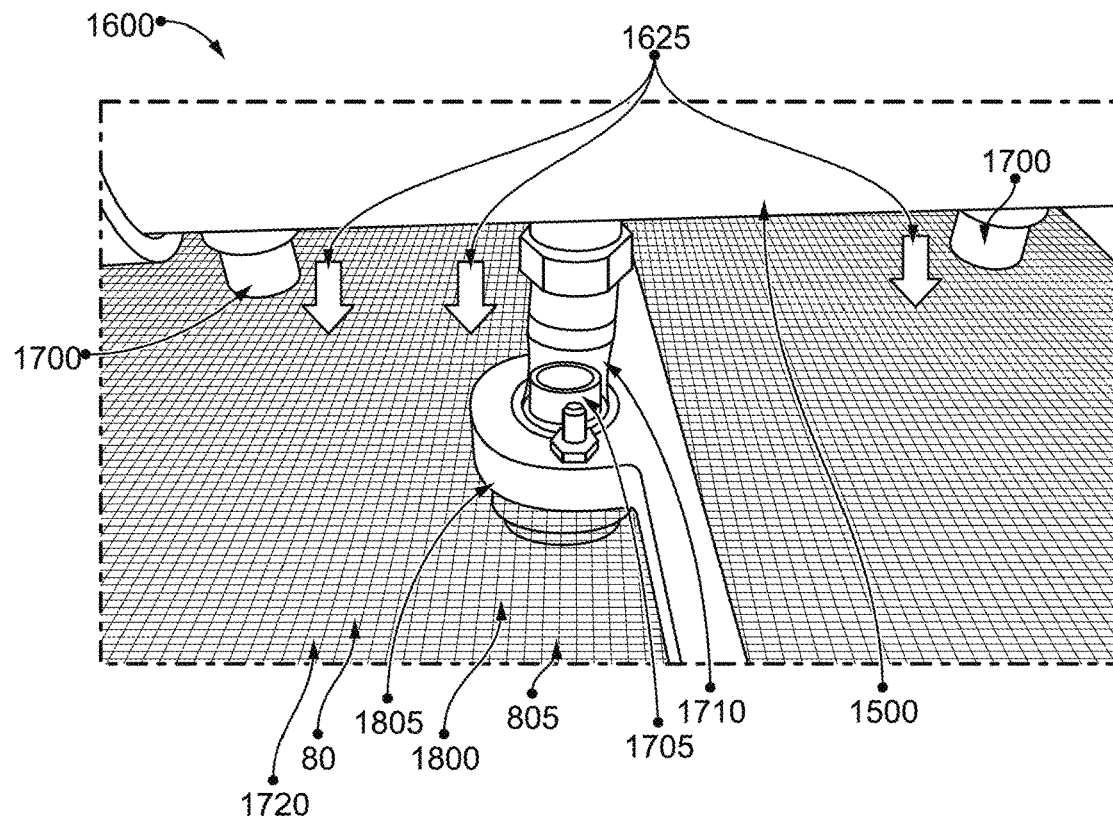
FIG. 18 shows an inside perspective view of an exemplary PFU.

FIG. 18 shows an inside perspective view of an exemplary PFU. In FIG. 18, the exemplary PFU 1600 includes the backwash pipe 1500 configured within the screen cage 80. In the depicted implementation the backwash pipe 1500 comprises the two inner nozzles 1700 and the outer nozzle 1705. In the depicted implementation the inner nozzles 1700 are disposed in the backwash pipe 1500 to spray clean the screen cage bottom 805 with water from the backwash pipe 1500, in the direction of the arrows indicating the backwash pipe water flow 1625. In the depicted implementation the outer nozzle 1705 is configured in the screen cage bottom 805 to spray clean the outside of the screen cage 80 with water from the backwash pipe 1500, through the port extension 1710. In the depicted implementation the outer nozzle 1705 is sealed in the screen cage inner surface 1800 with outer nozzle seal 1805 comprising non-toxic sealant.

Figure 19A:
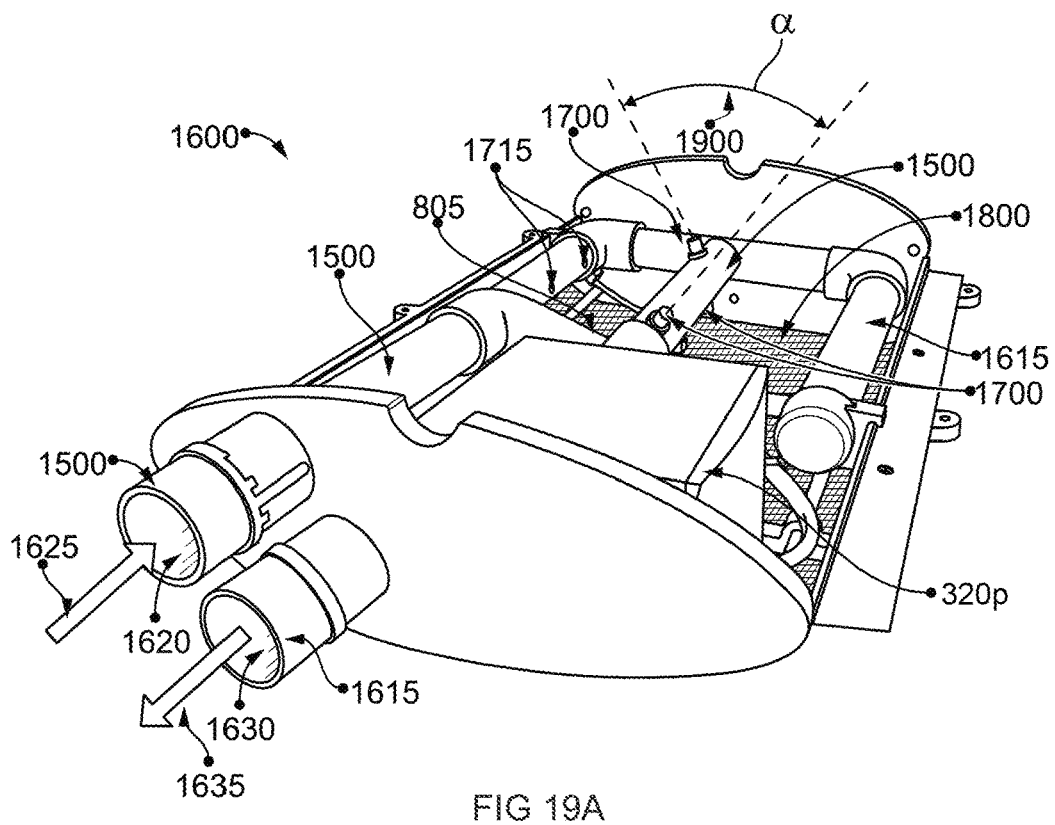
FIGS. 19A-19B show top perspective views of an exemplary PFU with the filter screen top removed.
Figure 19B:
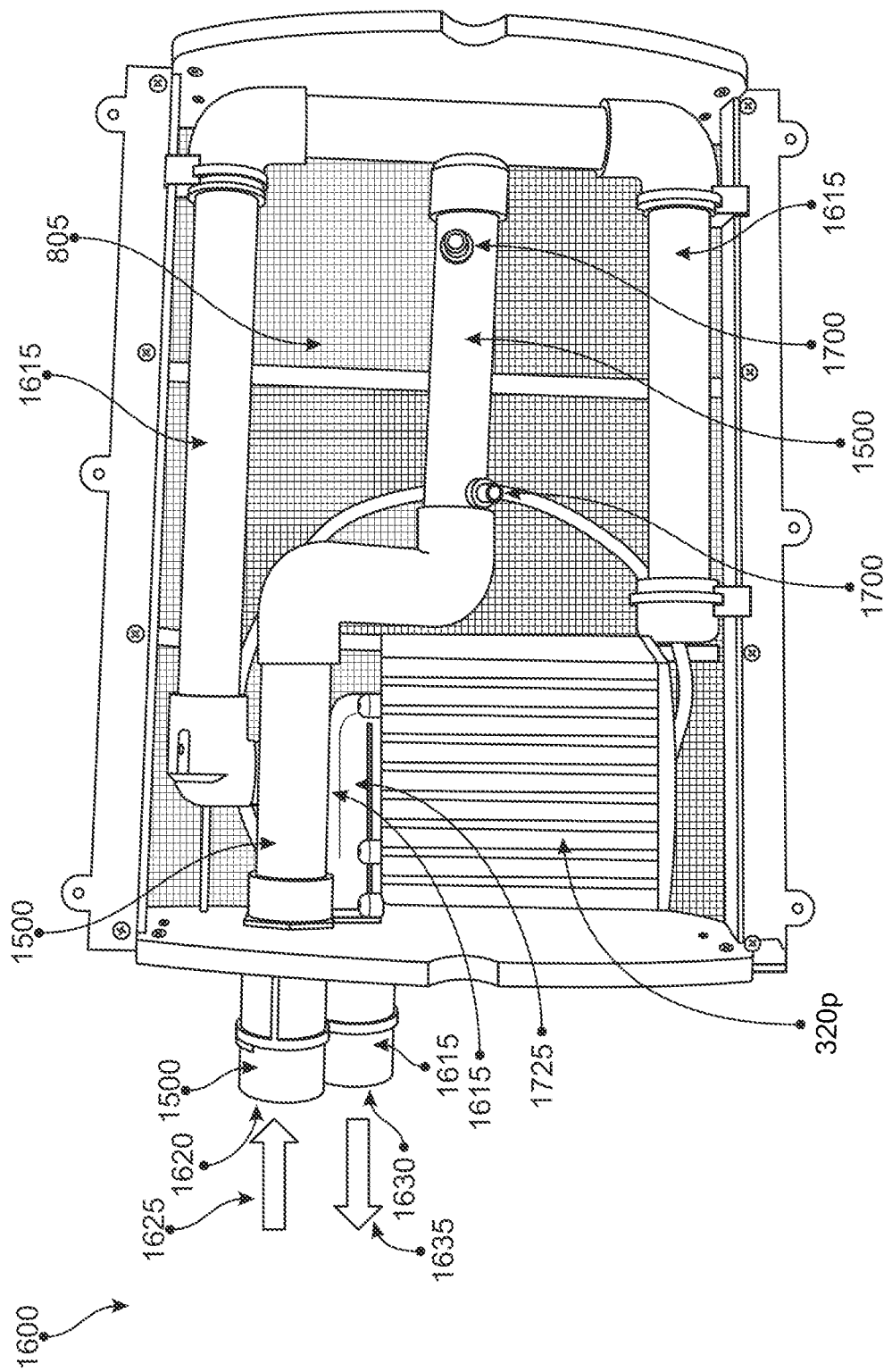

FIGS. 19A and 19B show top perspective views of an exemplary PFU with the filter screen top removed. In FIG. 19A, the backwash pipe 1500 comprises two inner nozzles 1700 configured in the top surface of the backwash pipe 1500, and one inner nozzle 1700 configured in the bottom surface of the backwash pipe 1500. In the depicted implementation the two inner nozzles 1700 configured in the top surface of the backwash pipe 1500 are disposed to spray clean from the inside of the screen cage 80 using the depicted spread angle 1900 to conserve water pressure and maximize cleaning effectiveness. In an illustrative example adjusting the spread angle 1900 from 10° to 40° such that the spray patterns do not overlap on the screen cage top inner surface may increase the total free-flowing surface area on the screen cage 80 that can be cleared of debris by the depicted inner nozzles 1700, without requiring additional water pressure. In the depicted implementation the filter pipe outlet 1630 is in fluid communication with an outlet of the circulation pump 320$p$. In the depicted implementation the circulation pump 320$p$ is fluidly coupled with the filter pipe 1615 within the screen cage, via a filter pipe pump connection (depicted at least by FIG. 17). FIG. 19B shows the exemplary PFU 1600 depicted by FIG. 19A from a top perspective illustrating an implementation configured with the filter pipe 1615 in fluid communication with the circulation pump 320$p$ through the filter pipe pump connection 1725. In the depicted implementation the backwash pipe 1500 is disposed above the filter pipe 1615.

FIG. 20 shows a top view of an exemplary PFU with the filter screen top removed. In FIG. 20, the exemplary PFU 1600 filter pipe 1615 is configured with the plurality of filter pipe inlet apertures 1715 disposed along the length of the filter pipe 1615. In the depicted implementation the filter pipe 1615 includes the filter pipe outlet 1630 disposed at the filter pipe proximal end 1615A. In the illustrated example the filter pipe extends within the screen cage 80 to the filter pipe distal end 1615B. In one implementation the plurality of filter pipe inlet apertures 1715 may increase in size from the filter pipe proximal end 1615A to the filter pipe distal end 1615B, to distribute pressure evenly in the screen cage 80. In the depicted implementation the PFU 1600 does not include a circulation pump within the screen cage 80. The exemplary backwash pipe 1500 may be configured with one or more inner nozzle 1700 disposed in a top, bottom, or side of the backwash pipe 1500, in accordance with what has been disclosed herein. The exemplary backwash pipe 1500 may be configured in fluid communication with one or more outer nozzle 1705 disposed in a top, bottom, or side of the screen cage 80, in accordance with what has been disclosed herein. In the depicted implementation the backwash pipe 1500 includes the backwash pipe inlet 1620 disposed at the backwash pipe proximal end 1500A. In the depicted implementation the backwash pipe distal end 1500B is supported within the screen cage 80 by the backwash pipe distal end support 2000.

Figure 21:
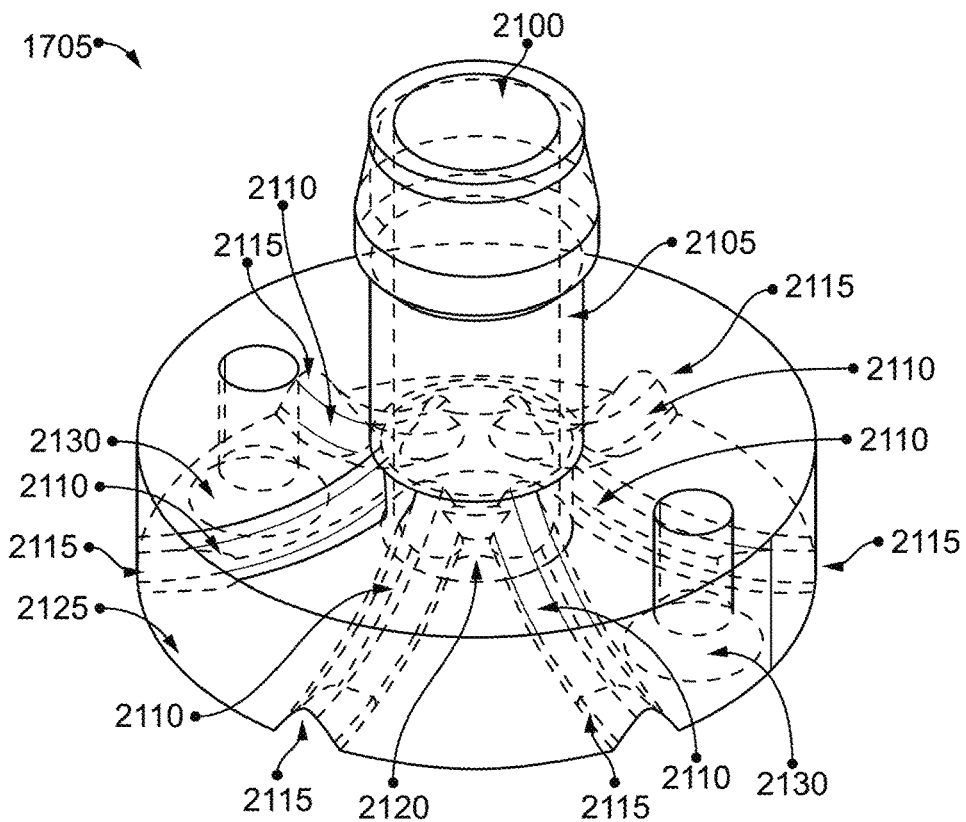
FIG. 21 shows a side perspective view of an exemplary outer nozzle.

FIG. 21 shows a side perspective view of an exemplary outer nozzle. In FIG. 21, the exemplary outer nozzle 1705 comprises the outer nozzle inlet 2100 configured with an opening central axis through the outer nozzle stem 2105. In the depicted implementation the outer nozzle inlet 2100 is in fluid communication with a plurality of outer nozzle radial channels 2110. In the illustrated implementation the plurality of outer nozzle radial channels 2110 is in fluid communication with a respective plurality of outer nozzle radial jet outlets 2115. The depicted exemplary outer nozzle 1705 includes the outer nozzle axial jet outlet 2120 in fluid communication with the outer nozzle inlet 2100. In the depicted implementation the exemplary outer nozzle 1705 is configured with the outer nozzle flange 2125 and two outer nozzle mount holes 2130 to permit securing the outer nozzle 1705 to a surface. In the depicted implementation the exemplary outer nozzle 1705 further comprises the outer nozzle inlet 2100 having an opening central axis, an outer nozzle axial jet outlet 2120 having an opening central axis substantially parallel to the outer nozzle inlet 2100 opening central axis, and six outer nozzle radial jet outlets 2115 each having an opening central axis substantially perpendicular to the outer nozzle inlet 2100 opening central axis. In the depicted implementation the outer nozzle radial channels 2110 further comprise central axes following paths that curve outward in a direction from the outer nozzle inlet 2100 toward the outer nozzle axial jet outlet 2120. Configuring the outer nozzle radial channel 2110 with a central axis following a path that curves outward in a direction from the outer nozzle inlet 2100 toward an outer nozzle axial jet outlet 2120 may direct spray using a sharpened angle of attack toward a surface to improve cleaning efficiency. In the depicted implementation the exemplary outer nozzle radial channel 2110 further comprises a substantially triangular-shaped channel visible at the end of each of the outer nozzle radial jet outlets 2115. The outer nozzle radial channel 2110 may be any shape. Configuring the outer nozzle radial channel 2110 with the substantially triangular-shaped channel may reduce fluid resistance and improve flow rate in the channel base, by having more surface area open at the base of the triangular-shaped channel. Reduced fluid resistance in the channel may improve water flow and help conserve pressure. The depicted exemplary outer nozzle radial jet outlets 2115 further comprise substantially rectangular openings (visible at least in FIG. 22) having an opening surface area disposed in a plane substantially perpendicular to the inlet 2100 opening central axis. Configuring the outer nozzle radial jet outlet 2115 with the substantially rectangular opening having an opening surface area disposed in a plane substantially perpendicular to the inlet 2100 opening central axis may reduce fluid resistance exiting the radial jet outlet 2115 and improve water flow rate for a given pressure, based on directing water flow both parallel to and at a slight angle below parallel to the screen cage.

Figure 22:
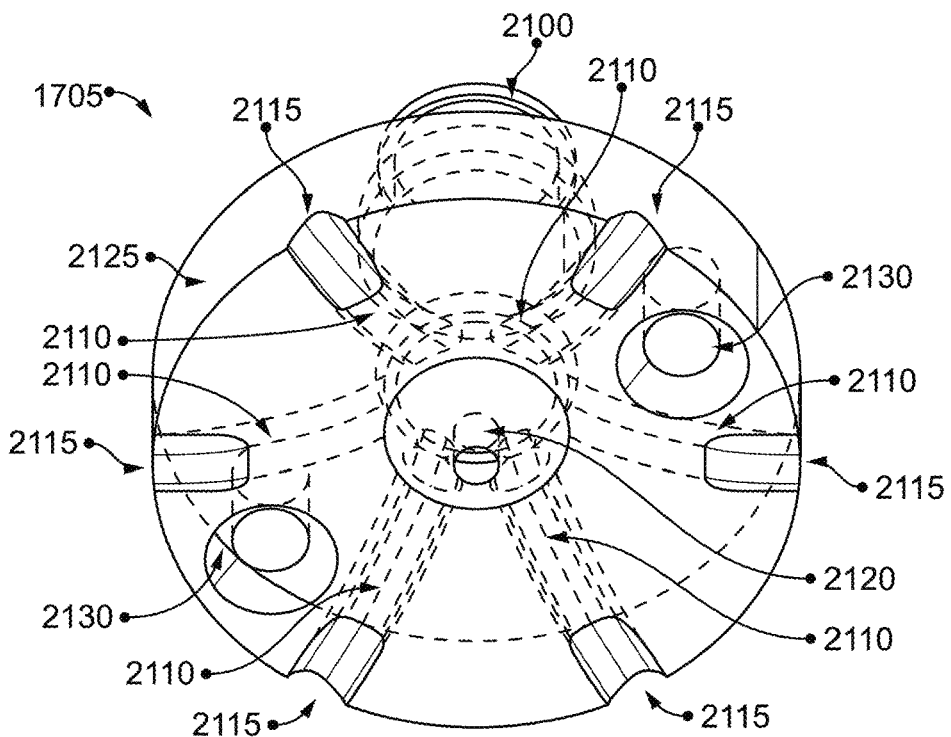
FIG. 22 shows an outlet end perspective view of an exemplary outer nozzle.

FIG. 22 shows an outlet end perspective view of the exemplary outer nozzle 1705 depicted by FIG. 22.

Figure 23:
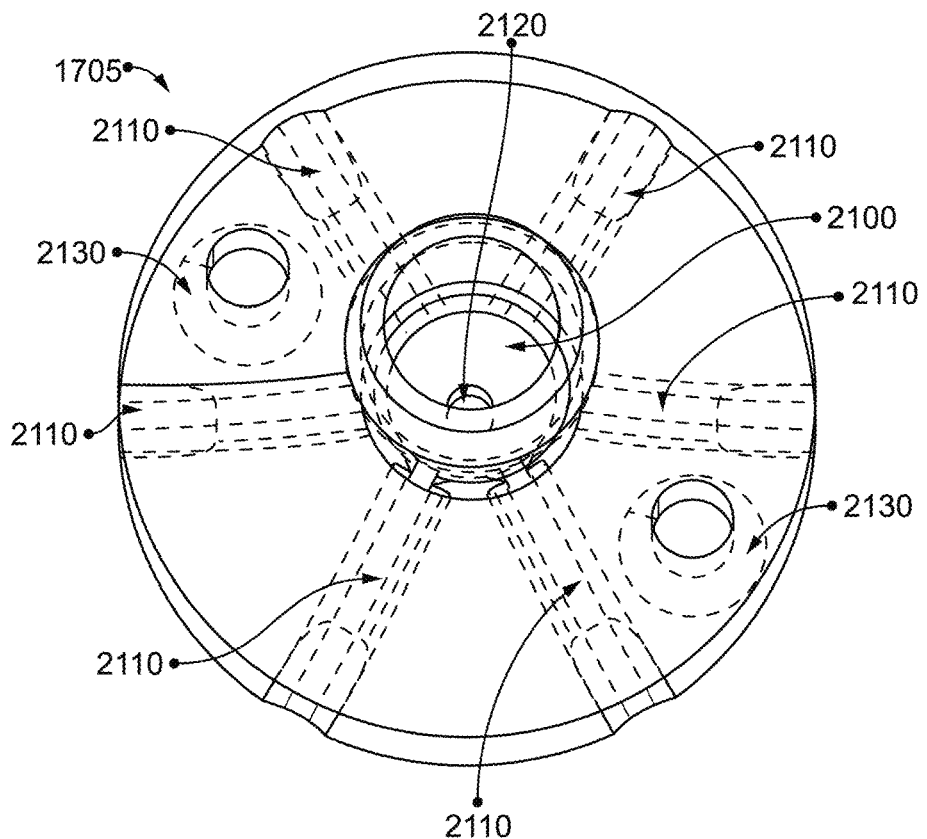
FIG. 23 shows an inlet end perspective view of an exemplary outer nozzle.

FIG. 23 shows an inlet end perspective view of the exemplary outer nozzle 1705 depicted by FIG. 21.

Figure 24:
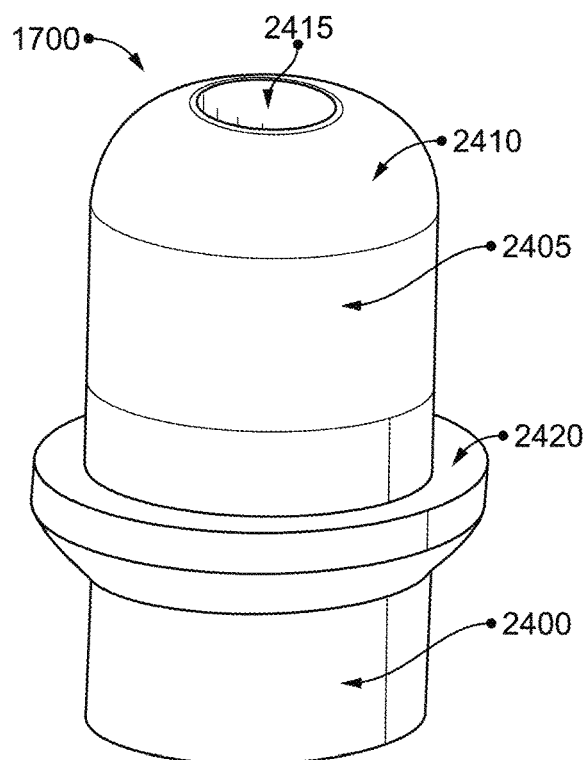
FIG. 24 shows a side perspective view of an exemplary inner nozzle.

FIG. 24 shows a side perspective view of an exemplary inner nozzle. In FIG. 24, the depicted exemplary inner nozzle 1700 comprises the inner nozzle inlet 2400 in fluid communication with the inner nozzle outlet 2415 through the inner nozzle swirling section 2405 and the inner nozzle restrictor section 2410. In the depicted implementation the exemplary inner nozzle 1700 includes the inner nozzle flange 2420 configured to permit fluid-tight mounting.

Figure 25:
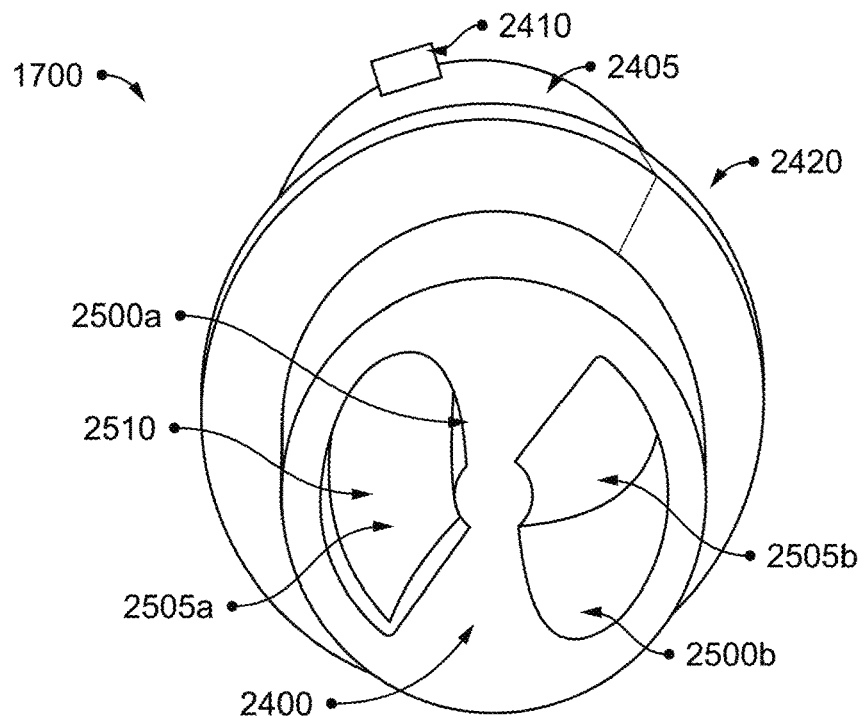
FIG. 25 shows an inlet end perspective view of an exemplary inner nozzle.

FIG. 25 shows an inlet end perspective view of an exemplary inner nozzle. In FIG. 25, the depicted exemplary inner nozzle 1700 comprises the inner nozzle inlet port 2500a and the inner nozzle inlet port 2500b in fluid communication with the inner nozzle helix channel 2505a and the inner nozzle helix channel 2505b. The inner nozzle helix channel 2505a and the inner nozzle helix channel 2505b form inner nozzle double helix channel 2505, visible through the inner nozzle outlet 2415 in FIG. 27.

Figure 26:
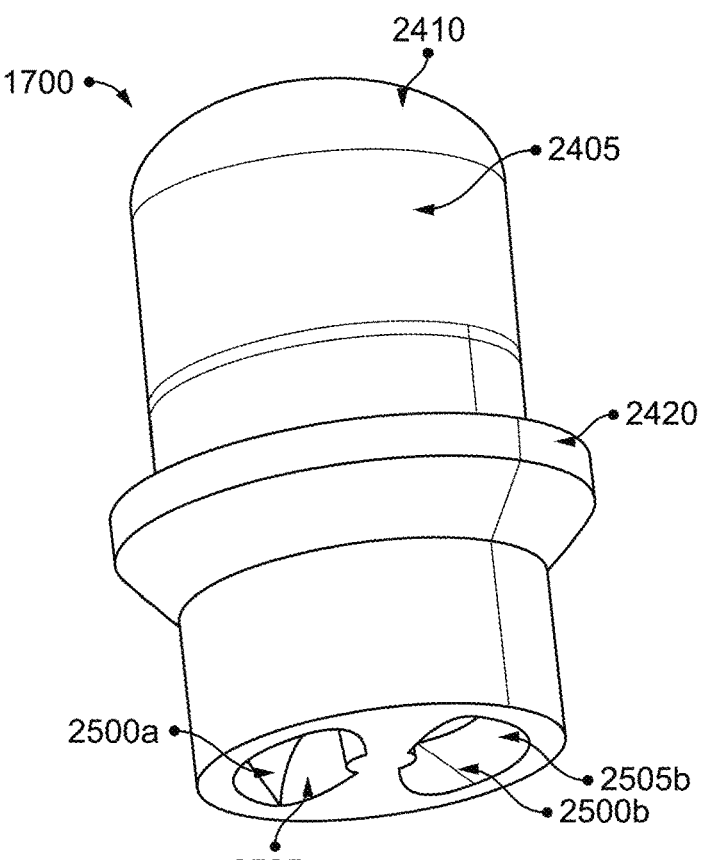
FIG. 26 shows a side perspective view of an exemplary inner nozzle.

FIG. 26 shows a side perspective view of the exemplary inner nozzle 1700 depicted by FIG. 25.

Figure 27:
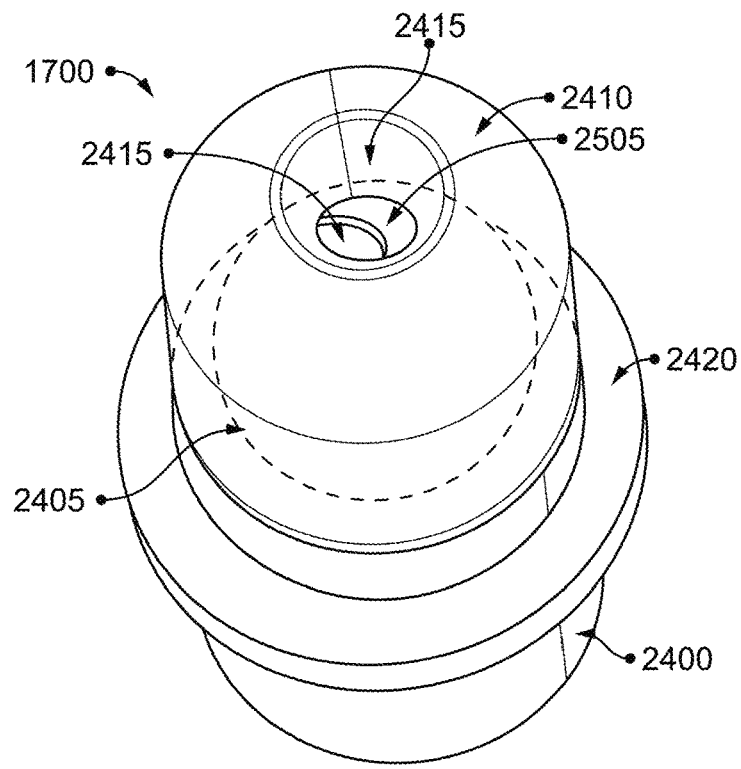
FIG. 27 shows an outlet end perspective view of an exemplary inner nozzle.

FIG. 27 shows an outlet end perspective view of the exemplary inner nozzle 1700 depicted by FIGS. 25 and 26.

In FIG. 27 the depicted inner nozzle outlet 2415 comprises a full cone outlet in fluid communication with the inner nozzle double helix channel 2505 through the inner nozzle restrictor section 2410.

Figure 28:
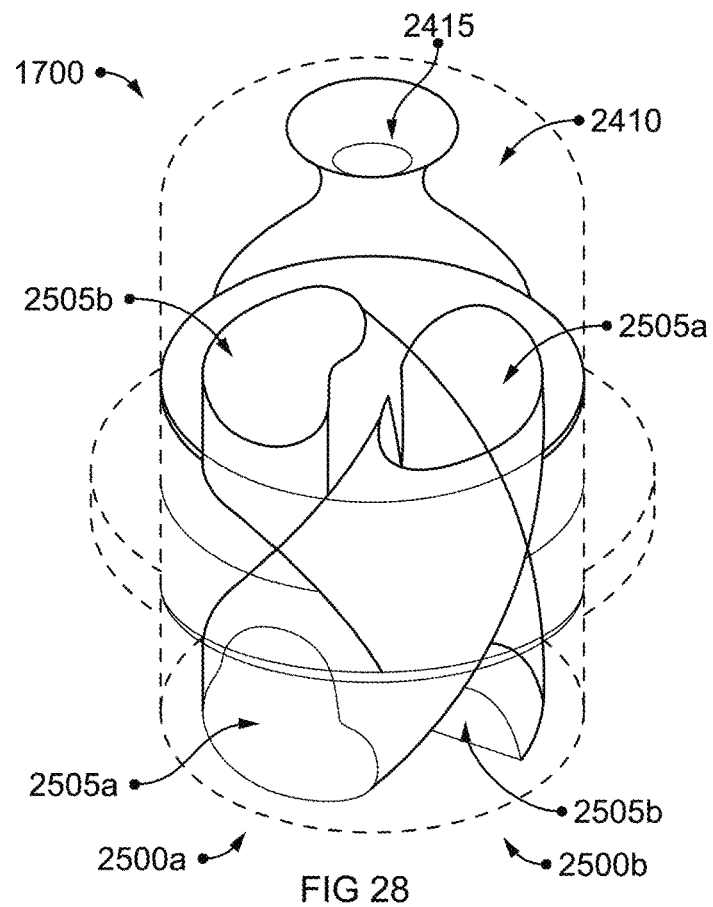
FIG. 28 shows a side perspective cross-section view of an exemplary inner nozzle.

FIG. 28 shows a side perspective cross-section view of the exemplary inner nozzle 1700 depicted by FIGS. 25, 26, and 27. In FIG. 28, the depicted inner nozzle 1700 is presented in cross-section showing the inner nozzle helix channel 2505a and the inner nozzle helix channel 2505b respectively in fluid communication with the inner nozzle inlet port 2500a and the inner nozzle inlet port 2500b. In the depicted implementation the full cone inner nozzle outlet 2415 is shown in fluid communication with the inner nozzle helix channel 2505a and the inner nozzle helix channel 2505b through the inner nozzle restrictor section 2410. The depicted inner nozzle restrictor section 2410 cross-section view shows the restrictor section 2410 is configured with a variable diameter chamber that decreases in diameter in the flow direction toward the full cone inner nozzle outlet 2415. Configuring the inner nozzle restrictor section 2410 with the variable diameter chamber that decreases in diameter in the flow direction toward the full cone inner nozzle outlet 2415 may intensify the water flow from the full cone inner nozzle outlet 2415 and may result in a more continuous or stronger conical spray than a design without the restrictor section 2410 variable diameter chamber. Configuring the inner nozzle 1700 with the swirling section comprising the double helical channels 2505a, 2505b may generate a swirling action in water jets passing from the pair of inlet ports 2500a, 2500b through the double helical channels 2505a, 2505b and restrictor section 2410 to the inner nozzle full cone outlet 2415. The swirling action of water jets from the double helical channels 2505a, 2505b creates the full cone spray pattern from the full cone nozzle outlet 2415 and may result in a more continuous and more powerful radial spray pattern from the full cone nozzle outlet 2415. This more continuous and more powerful radial spray pattern from the full cone nozzle outlet 2415 may be a result of the double helical channels 2505a, 2505b urging the water jets from a direction in line with the inner nozzle inlet 2400 central axis toward a direction radial from the full cone outlet 2415 central axis. The double helical channels 2505a, 2505b convert the water's velocity in line through the inner nozzle inlet 2400 into rotational velocity. Converting the water's velocity in line with the inlet 2400 to rotational velocity about the outlet 2415 central axis creates the full cone spray pattern, improves the strength of the outlet spray, and reduces resistance to water flow at the interface between the restrictor section 2410 and the full cone outlet 2415, by pre-positioning the water stream to spray radially from the full cone outlet 2415.

Figure 29:
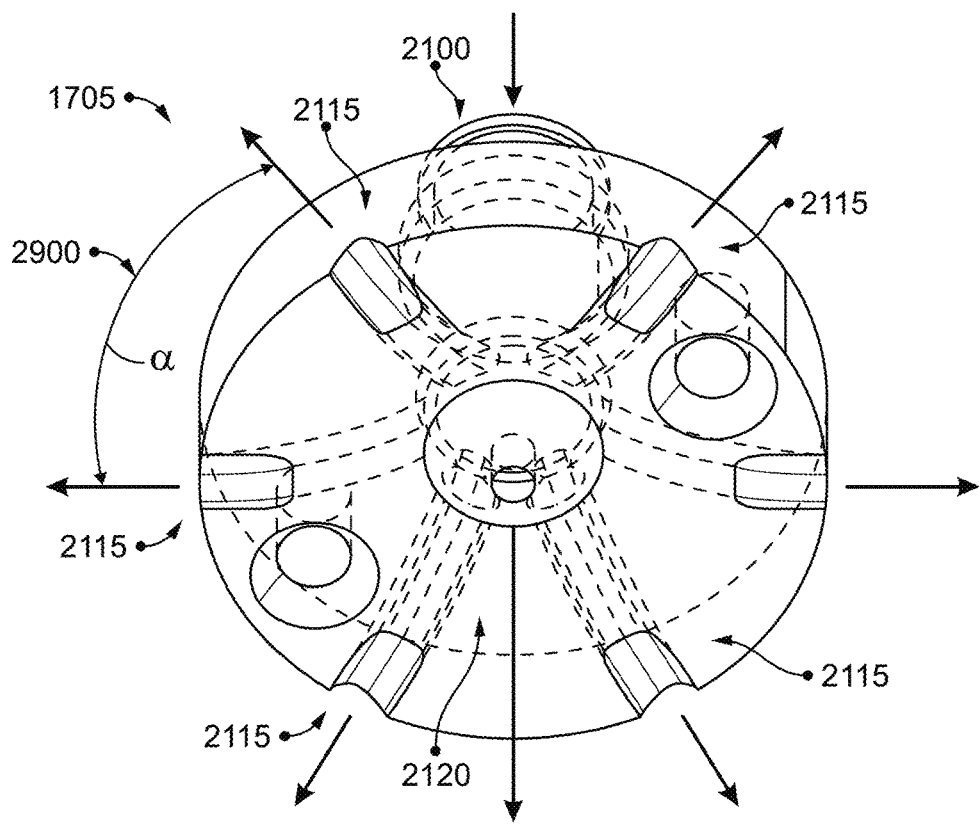
FIG. 29 shows an outlet end perspective view of an exemplary outer nozzle dispersion pattern.

FIG. 29 shows an outlet end perspective view of an exemplary outer nozzle dispersion pattern. In FIG. 29, the depicted exemplary outer nozzle 1705 comprises six outer nozzle radial jet outlets 2115 substantially equally spaced radially around the axial jet outlet 2120 opening central axis. In the depicted implementation the outer nozzle radial jet pairwise dispersion angle 2900 is approximately 60°. The outer nozzle radial jet pairwise dispersion angle 2900 may be configured to various dispersion angles based on a desired number of radial jet outlets 2115 and intended dispersion pattern. The arrow in line with the axial jet outlet 2120 shows the axial jet outlet 2120 opening central axis. In the depicted implementation the outer nozzle inlet 2100 opening central axis is substantially colinear with the axial jet outlet 2120 opening central axis. In some implementations the outer nozzle inlet 2100 opening central axis may be offset from the axial jet outlet 2120 opening central axis.

Figure 30:
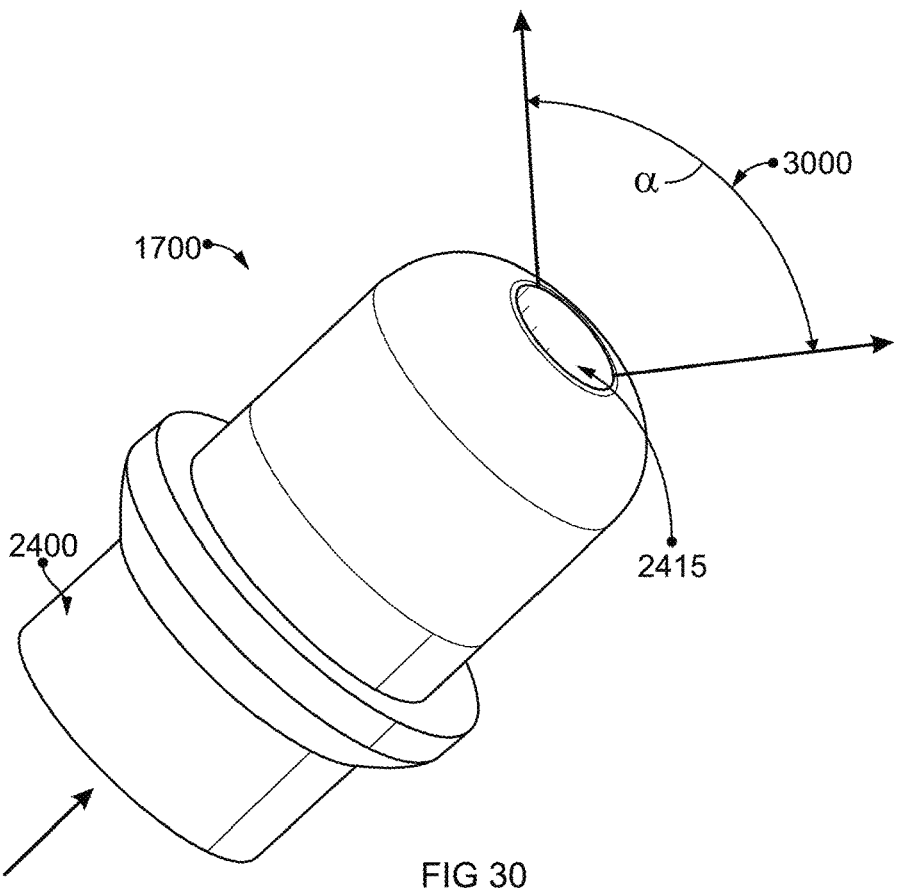
FIG. 30 shows a side perspective view of an exemplary inner nozzle dispersion pattern.

FIG. 30 shows a side perspective view of an exemplary inner nozzle dispersion pattern. In FIG. 30, the depicted exemplary inner nozzle full cone outlet 2415 may be configured to spray a full cone with an inner nozzle outlet dispersion angle 3000 from 30° to 90°. The arrow in line with the inlet 2400 shows the inner nozzle inlet 2400 central axis.

Figure 31:
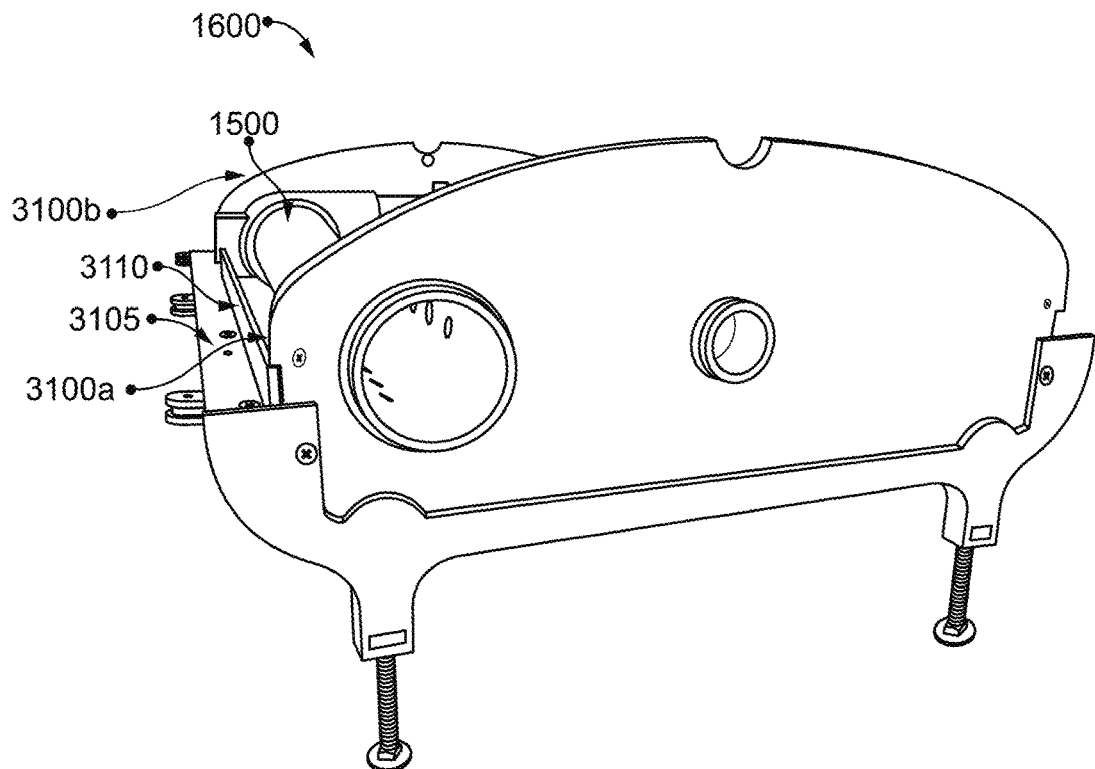
FIG. 31 shows a top perspective view of an exemplary PFU screen cage fastening implementation.
Figure 32:
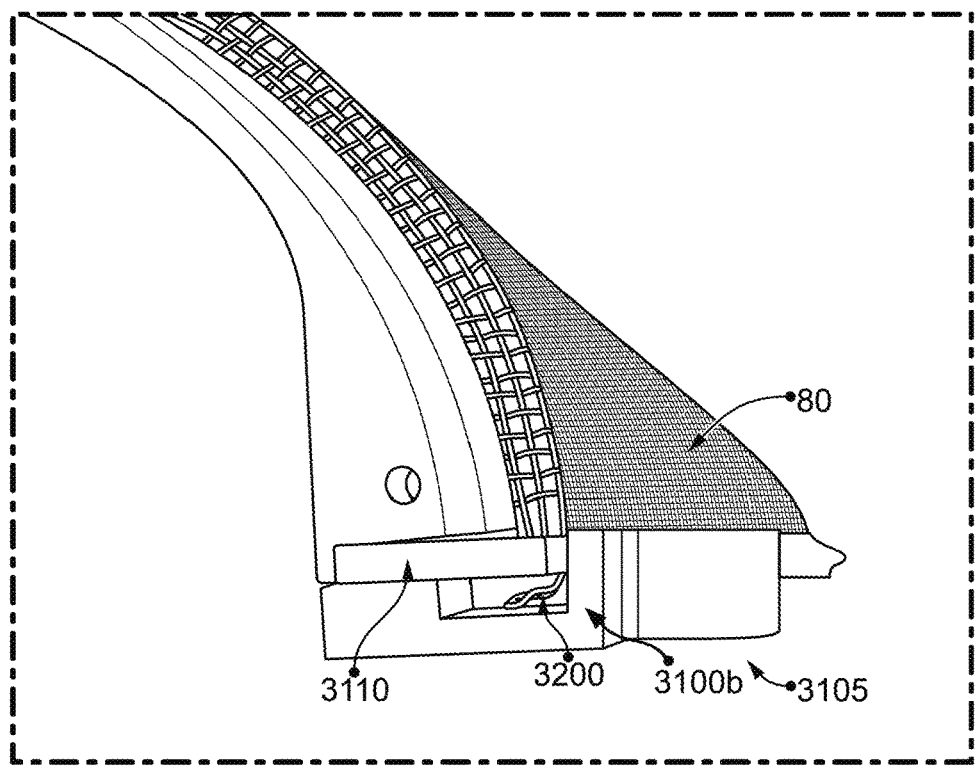
FIG. 32 shows a side perspective detail view of an exemplary PFU screen cage fastening implementation in accordance with the technique disclosed with reference to FIG. 31.

FIG. 31 shows a top perspective view of an exemplary PFU screen cage fastening implementation. In FIG. 31, the depicted PFU 1600 screen cage fastening implementation includes the bulkheads 3100a and 3100b that demarcate front and rear extents of the PFU 1600. In the depicted implementation the bend maintainer 3105 and the L-bracket 3110 are configured to secure a screen in the PFU 1600 by maintaining a securing bend (depicted in FIG. 32) in the screen. In the depicted implementation the opposing bend maintainer 3105 and the L-bracket 3110 work together to prevent the securing bend from becoming straight. Although there may be a loose fit between the screen and the opposing bend maintainer 3105 and the L-bracket 3110 that sandwich the screen to maintain the securing bend, pulling the screen out would require substantial force to straighten the securing bend. FIG. 32 shows a side perspective detail view of an exemplary PFU screen cage fastening implementation in accordance with the technique disclosed with reference to FIG. 31. In FIG. 32, the securing bend 3200 in the screen cage 80 is maintained by the bend maintainer 3105 opposing the L-bracket 3110 to sandwich the screen, resulting in a screen cage fastening implementation that is economical to manufacture and simplifies screen replacement in the field, while providing substantial screen retention strength.

Figure 33:
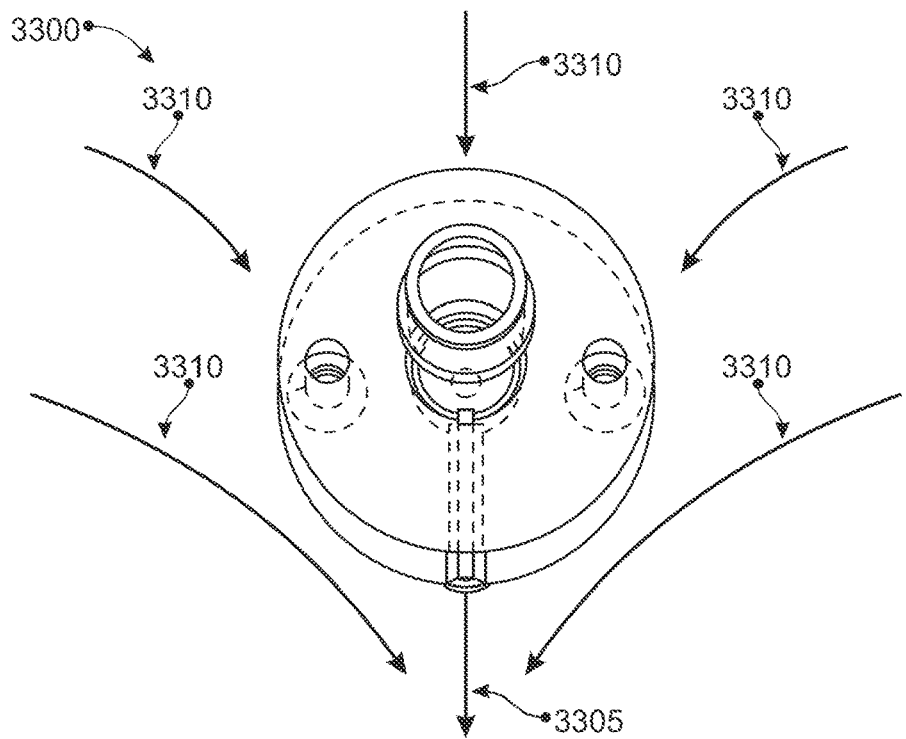
FIG. 33 shows a potential fluid flow problem that may be present in an application of an exemplary nozzle design.

FIG. 33 shows a potential fluid flow problem that may be present in an application of an exemplary nozzle design that is not in accordance with the teaching of the present disclosure. In FIG. 33, the exemplary nozzle 3300 is configured with one radial outlet jet in fluid communication with the inlet. In the depicted example the radial outlet jet sprays the outlet stream 3305. In the depicted example fluid from the environment is pushed in by higher pressure from the backside of the nozzle via fluid replacement flows 3310. The fluid replacement flows 3310 may include pond debris. In the depicted example the outlet stream 3305 may drive debris away from the nozzle 3300 in one direction while pulling debris toward the nozzle from the backside. In the example illustrated by FIG. 33 the nozzle 3300 configured with only one jet, or an exemplary nozzle configured with a plurality of jets only on one side of the nozzle, would cause material to be sucked in from the backside of the nozzle along with the water pulled in the direction of the jet exiting the nozzle, thereby degrading the nozzle cleaning effectiveness.

Figure 34:
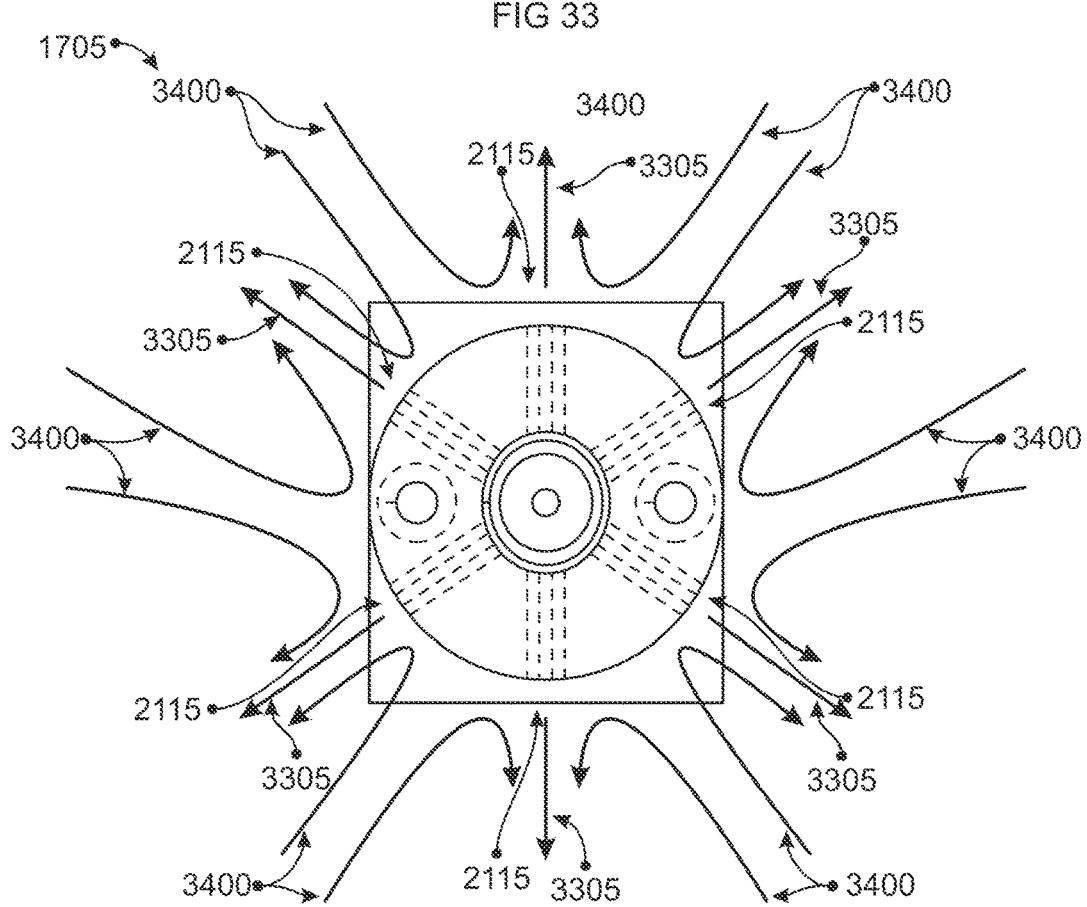
FIG. 34 shows an exemplary outer nozzle implementation configured in accordance with the present disclosure to eliminate the potential fluid flow problem depicted by FIG. 33.

FIG. 34 shows an exemplary outer nozzle implementation configured in accordance with the present disclosure to eliminate the potential fluid flow problem depicted by FIG. 33. In FIG. 34, the exemplary outer nozzle 1705 is configured with the plurality of radial jets 2115. In the depicted implementation the plurality of radial jets 2115 spray a respective plurality of outlet streams 3305. Spraying the plurality of outlet streams 3305 using the plurality of radial jets 2115 substantially equally spaced from the outer nozzle 1705 center point improves the effectiveness of the outer nozzle 1705 spray to drive water and material away from the nozzle substantially equally in all directions radially. In the example depicted by FIG. 34 the plurality of outlet streams 3305 substantially equally distributed around the nozzle center point produce the plurality of fluid replacement counter-flow pairs 3400 between each pair of the plurality of radial jets 2115. In the depicted example the fluid replacement flow is pushed in by higher pressure from the backside of the nozzle behind each outlet stream 3305 and driven radially outward from the nozzle by the adjacent outlet stream 3305. Configuring the outer nozzle 1705 with the plurality of radial jets 2115 substantially equally distributed around the nozzle center point eliminates any problem of material being sucked in from the backside of the nozzle, drives water and material substantially equally in all directions, and improves the effectiveness of the outer nozzle spray to drive material away from the nozzle and bottom of the PFU.

In an aspect, an exemplary apparatus may comprise a screen cage (80) comprising an inner surface (1800) and an outer surface (1605); a backwash pipe (1500) comprising a proximal end (1500A) and a distal end (1500B), wherein the distal end (1500B) is disposed within the screen cage (80); at least one inner nozzle (1700) disposed through a surface of the backwash pipe (1500) and configured to spray, within the screen cage (80), fluid from the backwash pipe (1500); and at least one outer nozzle (1705) disposed in a screen cage outer surface (1605) and configured to spray, outside the screen cage (80), fluid from the backwash pipe (1500).

The at least one outer nozzle (1705) may further comprise an inlet (2100) having an opening central axis, an axial jet outlet (2120) having an opening central axis substantially parallel to the inlet (2100) opening central axis, and at least one radial jet outlet (2115) having an opening central axis substantially perpendicular to the inlet (2100) opening central axis.

The at least one outer nozzle (1705) may further comprise the inlet (2100) is in fluid communication with the at least one radial jet outlet (2115).

The inlet (2100) may be in fluid communication with the at least one radial jet outlet (2115) through a radial channel (2110).

The radial channel (2110) may further comprise a central axis following a path that curves outward in a direction from the outer nozzle inlet (2100) toward an outer nozzle axial jet outlet (2120). Configuring the radial channel (2110) with a central axis following a path that curves outward in a direction from the outer nozzle inlet (2100) toward an outer nozzle axial jet outlet (2120) may direct spray at an angle of attack toward a screen cage surface to improve cleaning efficiency.

The radial channel (2110) may further comprise a substantially triangular-shaped channel. Configuring the radial channel (2110) with a substantially triangular-shaped channel may reduce fluid resistance in the channel, by having more surface area open at the base of the triangular-shaped channel. Reduced fluid resistance in the channel may improve water flow and conserve pressure.

The radial channel (2110) may further comprise a substantially triangular-shaped channel opening in fluid communication with the outer nozzle inlet (2100).

The radial channel (2110) may further comprise a substantially triangular-shaped channel opening in fluid communication with the at least one radial jet outlet (2115).

The substantially triangular-shaped ra*dial channel (2110) opening may further comprise a vertex of the triangular-shaped radial channel (2110) opening, wherein the vertex is proximal to the outer nozzle inlet (2100).

The substantially triangular-shaped radial channel (2110) opening may further comprise a base of the triangular-shaped radial channel (2110) opening, wherein the base is distal from the vertex of the triangular-shaped radial channel (2110) opening.

The at least one radial jet outlet (2115) may further comprise a substantially rectangular opening having an opening surface area disposed in a plane substantially perpendicular to the inlet (2100) opening central axis. Configuring the radial jet outlet (2115) with a substantially rectangular opening having an opening surface area disposed in a plane substantially perpendicular to the inlet (2100) opening central axis may reduce fluid resistance exiting the radial jet outlet (2115) and improve water flow.

The at least one radial jet outlet (2115) may further comprise a plurality of radial jet outlets (2115).

The plurality of radial jet outlets (2115) may be substantially equally spaced radially around the axial jet outlet (2120) opening central axis.

The plurality of radial jet outlets (2115) may be at least three radial jet outlets (2115).

The plurality of radial jet outlets (2115) may be six radial jet outlets (2115).

The at least one inner nozzle (1700) may further comprise an inner nozzle inlet (2400) comprising a plurality of inlet ports (2500a), (2500b).

The plurality of inlet ports (2500a), (2500b) may be in fluid communication with a respective plurality of helical channels (2505a), (2505b).

The plurality of helical channels (2505a), (2505b) may form a double helix channel (2505).

The plurality of inlet ports (2500a), (2500b) may be in fluid communication with an inner nozzle restrictor section (2410) through the double helix channel (2505).

The plurality of inlet ports (2500a), (2500b) may be in fluid communication with an inner nozzle outlet (2415) through the inner nozzle restrictor section (2410), wherein the inner nozzle outlet (2415) comprises a full cone outlet. The full cone outlet may be configured to spray a full cone pattern having a dispersion angle of 30° to 40°.

The inner nozzle restrictor section (2410) may further comprise a chamber having an inlet, an inlet diameter, a length, and an outlet diameter smaller than the inlet diameter. The inner nozzle restrictor section (2410) chamber diameter may decrease from inlet to outlet.

The screen cage (80) may further comprise a screen cage top (804) and a screen cage bottom (805).

The at least one inner nozzle (1700) may further comprise two inner nozzles (1700) disposed through a surface of the backwash pipe (1500) to spray fluid from the backwash pipe (1500) toward a screen cage (80) top (804) inner surface (1800) at a spread angle (1900) of 20° to 40°.

The at least one inner nozzle (1700) may further comprise at least one inner nozzle (1700) disposed through a surface of the backwash pipe (1500) to spray fluid from the backwash pipe (1500) toward a screen cage (80) inner surface (1800), wherein the screen cage inner surface (1800) further comprises the screen cage bottom (805).

The at least one outer nozzle (1705) disposed in the screen cage (80) may be configured to spray fluid from the backwash pipe (1500) in a direction substantially perpendicular to a screen cage (80) outer surface (1605) and in a plurality of directions substantially parallel to the screen cage (80) outer surface (1605), wherein the screen cage (80) outer surface (1605) further comprises the screen cage bottom (805).

The at least one outer nozzle (1705) disposed in the screen cage outer surface (1605) may be fluidly coupled with the backwash pipe (1500) by a port extension (1710).

The apparatus may further comprise a filter pipe (1615) comprising a proximal end (1615A) and a distal end (1615B), wherein the distal end is disposed within the screen cage (80).

The apparatus may further comprise the filter pipe (1615) configured with a plurality of inlet apertures (1715) disposed along a length of the filter pipe (1615) within the screen cage (80).

The plurality of inlet apertures (1715) may increase in size from the proximal end (1615A) to the distal end (1615B).

The filter pipe (1615) proximal end (1615A) may be in fluid communication with a circulation pump (320p).

An implementation in accordance with the present disclosure may be configured with cleaning nozzles inside a screen cage and outside of the cage. In exemplary scenarios illustrative of PFU design challenges, an exemplary PFU may be raised off the floor of the pond. This may be useful to provide maximum screen surface area, give fish access to the underside of the PFU, and prevent trapped pond water from growing scum underneath the unit. However, the space under the unit may also be a gathering place for big detritus, such as, for example, large leaves that may drop into the pond. This accumulation is unsightly, makes it difficult for the fish to work their way underneath, reduces water flow and decreases cleaning effectiveness. Nozzles inside pointing downward do not have enough force to push this excess accumulation along and out of the way of the pump and the fish, at least because the screens attenuate the flow enough to prevent this debris from being driven from underneath the screen cage. An exemplary PFU design challenge encompasses accomplishing a decent amount of cleaning using only standard tap water pressure (for example from a garden hose) without adding additional and/or more powerful nozzles to direct more flow there. Adding additional and/or more powerful nozzles may be counterproductive, as this would sap power from the other nozzles, and there is a limited pressure budget; thus, a useful design must conserve water pressure.

An inventive solution employed by implementations in accordance with the present disclosure may escape the confines of the cage with a nozzle positioned just outside of the cage. This requires creating a hole in the screen, and positioning nozzles with carefully crafted spray patterns to direct water exactly where the water needs to go while covering up as little surface area as possible. Thus, implementations in accordance with the present disclosure may be configured with a nozzle designed with six small openings that direct water flow both laterally and at a slight angle below parallel to the screen to push the debris away.

Although various features have been described with reference to the Figures, other features are possible. For example, an exemplary implementation may comprise a water circulation pump pre-filter unit (PFU). The PFU may be submerged and provides structure to camouflage the system to give a natural and aesthetic look. The PFU comprises at least two cleaning systems: (1) biological cleaning mechanism; and (2) an internal self-cleaning mechanism. Specifically, the PFU comprises several filtering surfaces that form a repository for pond debris on which fish and other aquatic creatures feed, i.e., the biological cleaning mechanism. These filtering surfaces of the PFU also provide a protective barrier that prevents large debris from entering the circulation pump. The internal self-cleaning mechanism is a spray wash water source mechanism used to clean the PFU without removing the PFU or fish from the pond or entering the water. Together these features improve the quality of the water in the pond and extend the life of a pump.

In one embodiment, the PFU has leg supports 901 built into the PFU. Support under the frame 90 allows the PFU to be placed at the bottom of a pond so that its filtering surfaces are not touching the bottom of the pond allowing free-flow of water and enough space for fish and other aquatic creatures to access the bottom surface of the screen cage 80. In another embodiment, the legs or supports are provided separately and placed underneath the PFU.

The present design contemplates the use of Koi and goldfish because they are the most common types of ornamental pond fish, however, other species of fish and other aquatic creatures may be used so long as they will eat the debris deposited on the PFU. In the present embodiment, common goldfish and Koi populate the pond. Both are extremely hardy and can survive temperature extremes. Also, they're both omnivores, eating a wide variety of foods. Algae may be one of their main and preferred food sources. Other fish species are contemplated as long as they can survive the climate and would do the same work as Koi and goldfish to fulfill the biological cleaning mechanism of the PFU.

In one embodiment, the screen cage 80 may be made of mesh material. The mesh material may comprise stainless steel. Configuring the screen cage 80 with mesh material comprising stainless steel may provide increased strength with minimal thickness and improve durability. It may be made with only one mesh layer. Whatever the mesh strength or number of layers comprising the screen cage 80, the PFU should have sufficient strength and surface to distribute pressure over a wide area and to sustain function in places where high-point pressure loads can occur when the screen cage is dirty. This will vary pond to pond. The invention is not limited to ornamental ponds and may be used in any type of marine habitat where a water circulation pump is used and fish are present. The PFU can be sized and scaled accordingly for use by one of ordinary skill in the art from ornamental backyard ponds to industrial-level fish farms. Anywhere a circulation pump is used, the combined cleaning mechanisms of the PFU will improve the quality of the water and extend the life of the circulation pump. Compared to commercially available systems, maintenance of the PFU is minimal.

In one embodiment, the PFU has tolerated internal self-cleaning water pressures of 92 psi, the unregulated pressure supplied by a local municipal water source. As for water pressure created by the circulation pump pulling water through the screen cage, the PFU has tolerated pressures created by a 4000 gallon per hour pump. Distributing that load over a wider area and improving the strength of the screen cage 80 will prevent excessive pump pressure from tearing the screen cage 80 and/or crushing the PFU. Such distribution of pressure across a wider area of the screen cage 80 may keep debris in place on the screen cage with sufficient force to adhere to the screen cage, yet with a force that is weak enough for aquatic creatures to easily remove the debris.

In one embodiment, the PFU has a circulation pump enclosed within the screen cage. This would create an "all-in-one" unit.

Particles that pass through the outside surfaces are small enough to pass easily through the pump without damaging it, thus there is no need for a filter media other than the filtering surfaces. Filter media would eventually clog the PFU and need to be pulled out, thus creating higher and more frequent maintenance. The PFU may work in concert with a biological filter that uses filter media (foam mats and plastic bio-ball-like parts). The PFU is in line ahead of the pump to prevent over-sized debris from damaging the pump. The PFU is not intended to be a microbiological filter system, but rather a pre-filtering system.

Embodiments of this invention are described herein. Variations of those embodiments may become apparent to those having ordinary skill in the art upon reading the foregoing description. The inventors expect that skilled artisans will employ such variations as appropriate, and the inventors intend for the invention to be practiced other than as specifically described herein. Accordingly, this invention includes all modifications and equivalents of the subject matter recited in the claims appended hereto as permitted by applicable law. Moreover, any combination of the above-described elements in all possible variations hereof is encompassed by the invention unless otherwise indicated herein or otherwise clearly contradicted by context.

Suitable methods and corresponding materials to make each of the individual parts of implementation apparatus are known in the art. One or more implementation part may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

While the disclosure above sets forth the principles of the present invention, with the examples given for illustration only, one should realize that the use of the present invention includes all usual variations, adaptations and/or modifications within the scope of the claims attached as well as equivalents thereof.

All references, including publications, patent applications, and patents cited herein are hereby incorporated by reference to the same extent as if each reference was individually and specifically indicated to be incorporated by reference and was set forth in its entirety herein.

The use of the terms "a" and "an" and "the" and similar references in the context of describing an invention (especially in the context of the following claims) are to be construed to cover both the singular and the plural, unless otherwise indicated herein or clearly contradicted by context. The terms "comprising," "having," "including," and "containing" are to be construed as open-ended terms (i.e., "including, but not limited to,") unless otherwise noted. Recitation of ranges as values herein are merely intended to serve as a shorthand method of referring individually to each separate value falling within the range, unless otherwise indicated herein, and each separate value is incorporated into the specification as if it was individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention (i.e., "such as, but not limited to,") unless otherwise claimed. No language in the specification should be construed as indicating any non-claimed element as essential to the practice of the invention.

Those skilled in the art will appreciate from the foregoing that various adaptations and modifications of the just described embodiments can be configured without departing from the scope and spirit of the invention. Therefore, it is to be understood that, within the scope of the appended claims, the invention may be practiced other than as specifically described herein.

What is claimed:

1. A method comprising: spraying a screen cage (80) interior using at least one inner nozzle (1700) mechanically connected to a backwash pipe (1500), wherein spraying comprises directing fluid from the backwash pipe (1500) through the at least one inner nozzle (1700) toward the screen cage (80) interior for self-cleaning a pre-filter for a water circulation pump and simultaneously spraying the screen cage (80) exterior using at least one outer nozzle (1705) mechanically connected to the backwash pipe (1500), said at least one outer nozzle (1705) traversing and secured to an outer surface (1605) of the screen cage (80), wherein spraying comprises directing fluid from the backwash pipe (1500) in an axial stream substantially perpendicular to and away from the screen cage (80) outer surface (1605) by an axial jet outlet (2120) and a plurality of simultaneous radial streams (3305) directed substantially perpendicular to the axial stream by a respective plurality of radial jet outlets (2115), for clearing debris from the outer surface (1605) and underside of the screen cage (80) for the water circulation pump.

2. The method of claim 1, wherein the screen cage (80) comprises an inner surface (1800) and an outer surface (1605), wherein the screen cage (80) has a screen cage entry side for traversing the inner surface (1800) and the outer surface (1605).

3. The method of claim 2, wherein the backwash pipe (1500) comprises a hollow structure having an open proximal end (1500A) and a closed distal end (1500B), wherein the backwash pipe (1500) runs through the screen cage entry side, and terminates at another location away from the screen cage entry side within the screen cage (80) interior, wherein the backwash pipe (1500) fits within the screen cage (80) interior and wherein the screen cage entry side is rotationally fixed with respect to the backwash pipe (1500).

4. The method of claim 3, wherein the at least one inner nozzle (1700) is disposed through a surface of the backwash pipe (1500) and configured to spray, within the screen cage (80) interior.

5. An apparatus kit comprising:
a screen cage (80) comprising an inner surface (1800) and an outer surface (1605), wherein the screen cage (80) has a screen cage entry side configured for traversing the inner surface (1800) and the outer surface (1605);
a backwash pipe (1500) comprising a hollow structure having an open proximal end (1500A) and a closed distal end (1500B), wherein the backwash pipe (1500) is configured to run through the screen cage entry side, and terminate at another location away from the screen cage entry side within the screen cage (80) interior, further wherein the backwash pipe (1500) fits within the screen cage (80) interior and wherein the screen cage entry side is configured to be rotationally fixed with respect to the backwash pipe (1500); and
at least one inner nozzle (1700) configured to be mechanically connected to the backwash pipe (1500) and configured to be disposed through a surface of the backwash pipe (1500) and configured to spray fluid, within the screen cage (80) interior, from the backwash pipe (1500), wherein the fluid is directed from the backwash pipe (1500) through the at least one inner nozzle (1700) toward the screen cage (80) interior to self-clean a pre-filter for a water circulation pump; and at least one outer nozzle (1705) configured to traverse and be mechanically connected in the screen cage (80) outer surface (1605) and configured to simultaneously spray, outside the screen cage (80), fluid from the backwash pipe (1500) directed in an axial stream substantially perpendicular to and away from the outer surface (1605) of the screen cage (80) by an axial jet outlet (2120) and a plurality of simultaneous radial streams (3305) configured to be directed substantially perpendicular to the axial stream by a respective plurality of radial jet outlets (2115) to clear debris from the outer surface (1605) and underside of the screen cage (80) for the water circulation pump.

* * * * *